United States Patent
St. John et al.

(10) Patent No.: US 10,689,264 B2
(45) Date of Patent: Jun. 23, 2020

(54) HYBRID DESALINATION SYSTEMS AND ASSOCIATED METHODS

(71) Applicant: Gradiant Corporation, Woburn, MA (US)

(72) Inventors: Maximus G. St. John, Boston, MA (US); Steven Lam, Medford, MA (US); Prakash Narayan Govindan, Melrose, MA (US)

(73) Assignee: Gradiant Corporation, Woburn, MA (US)

( * ) Notice: Subject to any disclaimer, the term of this patent is extended or adjusted under 35 U.S.C. 154(b) by 0 days.

(21) Appl. No.: 16/078,704

(22) PCT Filed: Feb. 22, 2017

(86) PCT No.: PCT/US2017/018808
§ 371 (c)(1),
(2) Date: Aug. 22, 2018

(87) PCT Pub. No.: WO2017/147113
PCT Pub. Date: Aug. 31, 2017

(65) Prior Publication Data
US 2019/0084842 A1 Mar. 21, 2019

Related U.S. Application Data

(60) Provisional application No. 62/298,332, filed on Feb. 22, 2016.

(51) Int. Cl.
*C02F 1/10* (2006.01)
*B01D 3/34* (2006.01)
(Continued)

(52) U.S. Cl.
CPC .............. *C02F 1/10* (2013.01); *B01D 1/14* (2013.01); *B01D 3/007* (2013.01); *B01D 3/143* (2013.01);
(Continued)

(58) Field of Classification Search
CPC .... C02F 1/04; C02F 1/041; C02F 1/10; B01D 3/007; B01D 3/14; B01D 3/143;
(Continued)

(56) References Cited

U.S. PATENT DOCUMENTS

| 2,151,990 A | 3/1939 | Ruys |
| 2,606,820 A | 8/1952 | Viggo |

(Continued)

FOREIGN PATENT DOCUMENTS

| CA | 2779732 A1 | 12/2012 |
| CA | 2818055 C | 11/2013 |

(Continued)

OTHER PUBLICATIONS

U.S. Appl. No. 14/494,101, filed Sep. 23, 2014, Govindan et al.
(Continued)

*Primary Examiner* — Brian A McCaig
(74) *Attorney, Agent, or Firm* — Wolf, Greenfield & Sacks, P.C.

(57) ABSTRACT

Systems and methods related to desalination systems are described herein. According to some embodiments, the desalination systems are hybrid systems comprising one or more first desalination units and one or more second desalination units. In some embodiments, the one or more second desalination units, which may form a fluidic circuit that is located downstream from the one or more first desalination units, may be configured to desalinate higher salinity liquid streams than the one or more first desalination units. In (Continued)

certain embodiments, the one or more first desalination units are operated under steady-state conditions and/or configured to operate under steady-state conditions. In certain embodiments, the one or more second desalination units are transiently operated and/or configured to facilitate transient operation. In some embodiments, a liquid stream comprising water and at least one dissolved salt is flowed through the one or more first desalination units, which are configured to remove at least a portion of the water from the liquid stream to form a first concentrated brine stream enriched in the dissolved salt. In some embodiments, at least a portion of the first concentrated brine stream is fed to a fluidic circuit comprising the one or more second desalination units. In some embodiments, the one or more second desalination units are configured to remove at least a portion of the water from the first concentrated brine stream to produce a second concentrated brine stream further enriched in the dissolved salt. In certain cases, the second concentrated brine stream is recirculated through at least a portion of the fluidic circuit until the second concentrated brine stream reaches a relatively high density (e.g., at least about 10 pounds per gallon) and/or a relatively high salinity (e.g., a total dissolved salt concentration of at least about 25 wt %).

18 Claims, 5 Drawing Sheets

(51) Int. Cl.
- B01D 5/00 (2006.01)
- C02F 1/04 (2006.01)
- B01D 3/00 (2006.01)
- B01D 3/14 (2006.01)
- B01D 1/14 (2006.01)
- C02F 103/08 (2006.01)
- C02F 103/18 (2006.01)
- C02F 103/30 (2006.01)
- C02F 103/06 (2006.01)
- B01D 1/28 (2006.01)
- C02F 103/28 (2006.01)
- C02F 103/10 (2006.01)

(52) U.S. Cl.
CPC ............. *B01D 3/146* (2013.01); *B01D 3/346* (2013.01); *B01D 5/006* (2013.01); *B01D 5/0027* (2013.01); *B01D 5/0036* (2013.01); *B01D 5/0039* (2013.01); *C02F 1/04* (2013.01); *B01D 1/28* (2013.01); *C02F 1/041* (2013.01); *C02F 2103/06* (2013.01); *C02F 2103/08* (2013.01); *C02F 2103/10* (2013.01); *C02F 2103/18* (2013.01); *C02F 2103/28* (2013.01); *C02F 2103/30* (2013.01); *C02F 2301/046* (2013.01); *Y02A 20/128* (2018.01)

(58) Field of Classification Search
CPC ........ B01D 3/146; B01D 3/346; B01D 5/006; B01D 5/0027; B01D 5/0036; B01D 5/0039
See application file for complete search history.

(56) References Cited

U.S. PATENT DOCUMENTS

| | | |
|---|---|---|
| 2,606,839 A | 8/1952 | Evans |
| 2,640,018 A | 5/1953 | Heath |
| 2,997,856 A | 8/1961 | Pike |
| 3,032,482 A | 5/1962 | Shoemaker |
| 3,042,606 A | 7/1962 | Salutsky et al. |
| 3,080,302 A | 3/1963 | Rogers et al. |
| 3,236,747 A | 2/1966 | Margiloff |
| 3,331,773 A | 7/1967 | Gunderson et al. |
| 3,454,490 A | 7/1969 | Wallace |
| 3,489,652 A | 1/1970 | Williamson |
| 3,625,761 A | 12/1971 | Tate |
| 3,725,209 A | 4/1973 | Rosa |
| 3,906,250 A | 9/1975 | Loeb |
| 3,922,154 A | 11/1975 | Kawasaki et al. |
| 3,926,739 A | 12/1975 | Izumi |
| 4,224,148 A | 9/1980 | Lindman et al. |
| 4,251,367 A | 2/1981 | Santora |
| 4,334,886 A | 6/1982 | Tani et al. |
| 4,452,696 A | 6/1984 | Lopez |
| 4,511,436 A | 4/1985 | el Din Nasser |
| 4,563,337 A | 1/1986 | Kim |
| 4,576,724 A | 3/1986 | Colman et al. |
| 4,708,805 A | 11/1987 | D'Muhala |
| 4,735,722 A | 4/1988 | Krepak |
| 4,755,298 A | 7/1988 | Grinstead |
| 4,770,775 A | 9/1988 | Lopez |
| 4,806,244 A | 2/1989 | Guilhem |
| 4,832,115 A | 5/1989 | Albers et al. |
| 4,843,828 A | 7/1989 | Gladman |
| 4,944,882 A | 7/1990 | Ray et al. |
| 4,956,157 A | 9/1990 | Nasu |
| 4,973,201 A | 11/1990 | Paul et al. |
| 4,980,077 A | 12/1990 | Morris et al. |
| 4,981,593 A | 1/1991 | Priestley et al. |
| 5,015,391 A | 5/1991 | Mohn |
| 5,053,132 A | 10/1991 | Sirkar |
| 5,123,481 A | 6/1992 | Albers et al. |
| 5,167,828 A | 12/1992 | Emmons et al. |
| 5,190,656 A | 3/1993 | Paul et al. |
| 5,225,087 A | 7/1993 | Kardos |
| 5,238,574 A | 8/1993 | Kawashima et al. |
| 5,250,185 A | 10/1993 | Tao et al. |
| 5,282,995 A | 2/1994 | Paul et al. |
| 5,328,616 A | 7/1994 | Martyak et al. |
| 5,425,902 A | 6/1995 | Miller et al. |
| 5,453,205 A | 9/1995 | Browne |
| 5,464,540 A | 11/1995 | Friesen et al. |
| 5,656,161 A | 8/1997 | Solomon et al. |
| 5,840,195 A | 11/1998 | Delsalle et al. |
| 6,010,631 A | 1/2000 | Delsalle et al. |
| 6,056,878 A | 5/2000 | Tessier et al. |
| 6,062,070 A | 5/2000 | Maltby et al. |
| 6,113,797 A | 9/2000 | Al-Samadi |
| 6,146,525 A | 11/2000 | Li et al. |
| 6,187,200 B1 | 2/2001 | Yamamura et al. |
| 6,190,556 B1 | 2/2001 | Uhlinger |
| 6,270,671 B1 | 8/2001 | Shorr et al. |
| 6,319,409 B1 | 11/2001 | Saitou et al. |
| 6,416,668 B1 | 7/2002 | Al-Samadi et al. |
| 6,423,235 B1 | 7/2002 | Shimoi et al. |
| 6,440,310 B1 | 8/2002 | Shorr et al. |
| 6,461,514 B1 | 10/2002 | Al-Samadi |
| 6,508,936 B1 | 1/2003 | Hassan |
| 6,582,605 B2 | 6/2003 | Krulik et al. |
| 6,699,369 B1 | 3/2004 | Hartman et al. |
| 6,730,234 B2 | 5/2004 | Symens et al. |
| 6,783,682 B1 | 8/2004 | Awerbuch |
| 6,817,476 B2 | 11/2004 | Donnick et al. |
| 6,919,000 B2 | 7/2005 | Klausner et al. |
| 7,022,240 B2 | 4/2006 | Hart et al. |
| 7,048,852 B2 | 5/2006 | Ballard |
| 7,115,670 B2 | 10/2006 | Hensman et al. |
| 7,141,171 B2 | 11/2006 | Lightfoot |
| 7,225,620 B2 | 6/2007 | Klausner et al. |
| 7,306,437 B2 | 12/2007 | Hauge |
| 7,316,080 B1 | 1/2008 | Woolsey |
| 7,459,084 B2 | 12/2008 | Baig et al. |
| 7,459,088 B2 | 12/2008 | Davis |
| 7,465,376 B2 | 12/2008 | Neubert et al. |
| 7,510,656 B2 | 3/2009 | Shafer et al. |
| 7,520,993 B1 | 4/2009 | Laraway et al. |
| 7,527,726 B2 | 5/2009 | Slough et al. |
| 7,597,784 B2 | 10/2009 | Bednarek et al. |

(56) References Cited

U.S. PATENT DOCUMENTS

| | | |
|---|---|---|
| 7,678,235 B2 | 3/2010 | Deep et al. |
| 7,718,069 B2 | 5/2010 | Laraway et al. |
| 7,726,398 B2 | 6/2010 | Collins et al. |
| 7,727,400 B2 | 6/2010 | Flynn |
| 7,731,847 B2 | 6/2010 | Ton That |
| 7,815,804 B2 | 10/2010 | Nagghappan |
| 7,824,552 B2 | 11/2010 | Slabaugh et al. |
| 7,950,921 B1 | 5/2011 | Woolsey |
| 7,964,101 B2 | 6/2011 | Slough et al. |
| 8,012,358 B2 | 9/2011 | Slabaugh et al. |
| 8,043,509 B2 | 10/2011 | Thiers |
| 8,119,007 B2 | 2/2012 | Bajpayee et al. |
| 8,147,696 B1 | 4/2012 | Pandya |
| 8,197,693 B2 | 6/2012 | Al-Jlil |
| 8,216,473 B2 | 7/2012 | Wohlert |
| 8,252,092 B2 | 8/2012 | Govindan et al. |
| 8,292,272 B2 | 10/2012 | Elsharqawy et al. |
| 8,366,924 B2 | 2/2013 | Vuong |
| 8,469,092 B2 | 6/2013 | Curole et al. |
| 8,501,007 B2 | 8/2013 | Bajpayee et al. |
| 8,523,985 B2 | 9/2013 | Govindan et al. |
| 8,562,824 B2 | 10/2013 | Thiers et al. |
| 8,647,477 B2 | 2/2014 | Govindan et al. |
| 8,678,080 B2 | 3/2014 | Curole et al. |
| 8,679,347 B2 | 3/2014 | Al-Samadi |
| 8,695,343 B2 | 4/2014 | Moe |
| 8,727,325 B2 | 5/2014 | Sparrow et al. |
| 8,771,477 B2 | 7/2014 | Thiers |
| 8,778,065 B2 | 7/2014 | Govindan et al. |
| 8,794,320 B2 | 8/2014 | Ayirala et al. |
| 8,820,723 B1 | 9/2014 | Sparrow et al. |
| 8,840,792 B2 | 9/2014 | Wohlert |
| 8,857,798 B1 | 10/2014 | Sparrow et al. |
| 8,889,000 B2 | 11/2014 | Hannemann et al. |
| 8,980,100 B2 | 3/2015 | Chidambaran |
| 8,999,172 B1 | 4/2015 | Zuback |
| 9,072,984 B2 | 7/2015 | Govindan et al. |
| 9,079,117 B2 | 7/2015 | Govindan et al. |
| 9,085,971 B2 | 7/2015 | Janssen et al. |
| 9,120,033 B2 | 9/2015 | Govindan et al. |
| 9,221,694 B1 | 12/2015 | Govindan et al. |
| 9,266,748 B1 | 2/2016 | Govindan et al. |
| 9,266,762 B2 | 2/2016 | Wang et al. |
| 9,428,404 B2 | 8/2016 | Bajpayee et al. |
| 9,550,685 B2 | 1/2017 | Klausner et al. |
| 9,556,041 B2 | 1/2017 | Govindan et al. |
| 9,617,169 B2 | 4/2017 | Govindan et al. |
| 9,617,179 B2 | 4/2017 | Govindan et al. |
| 9,700,811 B2 | 7/2017 | Govindan et al. |
| 9,957,180 B2 | 5/2018 | Govindan et al. |
| 9,969,638 B2 | 5/2018 | Govindan et al. |
| 9,981,860 B2 | 5/2018 | Govindan et al. |
| 10,167,218 B2 | 1/2019 | St. John et al. |
| 10,179,296 B2 | 1/2019 | Govindan et al. |
| 10,479,701 B2 | 11/2019 | Govindan et al. |
| 2002/0166758 A1 | 11/2002 | Vinz |
| 2003/0106860 A1 | 6/2003 | Peloquin et al. |
| 2003/0132166 A1 | 7/2003 | Rey |
| 2004/0187897 A1 | 9/2004 | Kenowski et al. |
| 2005/0023222 A1 | 2/2005 | Baillie |
| 2006/0060532 A1 | 3/2006 | Davis et al. |
| 2006/0150892 A1 | 7/2006 | Mayer |
| 2006/0157409 A1 | 7/2006 | Hassan |
| 2006/0157410 A1 | 7/2006 | Hassan |
| 2007/0012556 A1 | 1/2007 | Lum et al. |
| 2007/0068791 A1 | 3/2007 | Thom et al. |
| 2007/0080113 A1 | 4/2007 | Vuong |
| 2007/0084713 A1 | 4/2007 | Deep et al. |
| 2007/0102359 A1 | 5/2007 | Lombardi et al. |
| 2007/0131428 A1 | 6/2007 | Willem Cornelis den Boestert et al. |
| 2007/0181480 A1 | 8/2007 | Lee |
| 2007/0235391 A1 | 10/2007 | Ylikangas et al. |
| 2008/0073200 A1 | 3/2008 | Godshall et al. |
| 2008/0102119 A1 | 5/2008 | Grovender |
| 2008/0105534 A1 | 5/2008 | Taylor et al. |
| 2008/0116134 A1 | 5/2008 | Cartwright |
| 2008/0121585 A1 | 5/2008 | Mavis |
| 2008/0277344 A1 | 11/2008 | Sengupta et al. |
| 2009/0020289 A1 | 1/2009 | Sharif |
| 2009/0032446 A1 | 2/2009 | Wiemers et al. |
| 2009/0101490 A1 | 4/2009 | Thiers |
| 2009/0101587 A1 | 4/2009 | Blokker et al. |
| 2009/0127210 A1 | 5/2009 | Swisher |
| 2009/0173096 A1 | 7/2009 | Wohlert |
| 2009/0184065 A1 | 7/2009 | Cremer et al. |
| 2009/0194272 A1 | 8/2009 | Baillie |
| 2009/0218210 A1 | 9/2009 | Demmons et al. |
| 2009/0277634 A1 | 11/2009 | Case et al. |
| 2009/0277640 A1 | 11/2009 | Thompson et al. |
| 2009/0277641 A1 | 11/2009 | Walters et al. |
| 2009/0308820 A1 | 12/2009 | Thiers et al. |
| 2010/0032377 A1 | 2/2010 | Wohlert |
| 2010/0163471 A1 | 7/2010 | Elyanow et al. |
| 2010/0163472 A1 | 7/2010 | Thiers et al. |
| 2010/0234795 A1 | 9/2010 | Wallenäs |
| 2010/0242995 A1 | 9/2010 | Xiong et al. |
| 2010/0282675 A1 | 11/2010 | Sengupta et al. |
| 2010/0314238 A1 | 12/2010 | Frolov et al. |
| 2011/0017677 A1 | 1/2011 | Evans |
| 2011/0024354 A1 | 2/2011 | Xia et al. |
| 2011/0056822 A1 | 3/2011 | Elsharqawy et al. |
| 2011/0056878 A1 | 3/2011 | Matsushiro et al. |
| 2011/0079504 A1 | 4/2011 | Govindan et al. |
| 2011/0094965 A1 | 4/2011 | Al-Samadi |
| 2011/0108484 A1 | 5/2011 | Liberman et al. |
| 2011/0114558 A1 | 5/2011 | Al-Mayahi et al. |
| 2011/0120157 A1 | 5/2011 | Wohlert |
| 2011/0155666 A1 | 6/2011 | Prakash et al. |
| 2011/0180479 A1 | 7/2011 | Cordatos et al. |
| 2011/0198285 A1 | 8/2011 | Wallace |
| 2011/0215039 A1 | 9/2011 | Acernese et al. |
| 2011/0233137 A1 | 9/2011 | Cath et al. |
| 2011/0257788 A1 | 10/2011 | Wiemers et al. |
| 2011/0303607 A1 | 12/2011 | Vora et al. |
| 2011/0306525 A1 | 12/2011 | Lighthelm |
| 2012/0012005 A1 | 1/2012 | Burke |
| 2012/0012511 A1 | 1/2012 | Kim et al. |
| 2012/0037568 A1 | 2/2012 | Karrs et al. |
| 2012/0067820 A1 | 3/2012 | Henthorne et al. |
| 2012/0090833 A1 | 4/2012 | Ligtlhelm et al. |
| 2012/0091061 A1 | 4/2012 | Al-Jlil |
| 2012/0125603 A1 | 5/2012 | Willingham et al. |
| 2012/0125611 A1 | 5/2012 | Ayirala et al. |
| 2012/0125861 A1 | 5/2012 | Thiers |
| 2012/0145635 A1 | 6/2012 | Lucas, III et al. |
| 2012/0160753 A1 | 6/2012 | Vora et al. |
| 2012/0199524 A1 | 8/2012 | Bly et al. |
| 2012/0199534 A1 | 8/2012 | Holtzapple et al. |
| 2012/0205307 A1 | 8/2012 | Boudinar |
| 2012/0227975 A1 | 9/2012 | Ayirala et al. |
| 2012/0234664 A1 | 9/2012 | Nicoll |
| 2012/0234765 A1 | 9/2012 | Sengupta et al. |
| 2012/0267307 A1 | 10/2012 | McGinnis |
| 2012/0279396 A1 | 11/2012 | Brammer et al. |
| 2012/0292259 A1 | 11/2012 | Marcin |
| 2012/0312755 A1 | 12/2012 | Ryan et al. |
| 2013/0008079 A1 | 1/2013 | Chung et al. |
| 2013/0043190 A1 | 2/2013 | Al-Samadi et al. |
| 2013/0056193 A1 | 3/2013 | Thiers |
| 2013/0074694 A1 | 3/2013 | Govindan et al. |
| 2013/0075098 A1 | 3/2013 | Janjua et al. |
| 2013/0075940 A1 | 3/2013 | Govindan et al. |
| 2013/0087501 A1 | 4/2013 | Moe et al. |
| 2013/0092626 A1 | 4/2013 | Zimmerman et al. |
| 2013/0105323 A1 | 5/2013 | Averbeck et al. |
| 2013/0118887 A1 | 5/2013 | Frolov et al. |
| 2013/0193074 A1 | 8/2013 | Voigt et al. |
| 2013/0199921 A1 | 8/2013 | McGovern |
| 2013/0213892 A1 | 8/2013 | Henthorne |
| 2013/0233786 A1 | 9/2013 | Posa |
| 2013/0240442 A1 | 9/2013 | Chidambaran et al. |
| 2013/0318743 A1 | 12/2013 | Chinta et al. |
| 2014/0021135 A1 | 1/2014 | Sawyer et al. |

(56) References Cited

U.S. PATENT DOCUMENTS

| | | |
|---|---|---|
| 2014/0041856 A1 | 2/2014 | Janssen et al. |
| 2014/0042058 A1 | 2/2014 | Janssen et al. |
| 2014/0042061 A1 | 2/2014 | Wallace |
| 2014/0061022 A1 | 3/2014 | Passarelli |
| 2014/0061958 A1 | 3/2014 | Sparrow et al. |
| 2014/0067958 A1 | 3/2014 | Bradley et al. |
| 2014/0069821 A1 | 3/2014 | Marcin et al. |
| 2014/0116956 A1 | 5/2014 | Yuan et al. |
| 2014/0151300 A1 | 6/2014 | Savage et al. |
| 2014/0158635 A1* | 6/2014 | Katyal .................. C02F 1/22 210/742 |
| 2014/0197022 A1 | 7/2014 | Antar et al. |
| 2014/0197029 A1 | 7/2014 | Sparrow et al. |
| 2014/0246368 A1 | 9/2014 | Neubrand et al. |
| 2014/0263055 A1 | 9/2014 | Govindan et al. |
| 2014/0263081 A1 | 9/2014 | Thiers |
| 2014/0291137 A1 | 10/2014 | Barton et al. |
| 2014/0299462 A1 | 10/2014 | Thiers |
| 2014/0339162 A1 | 11/2014 | Cao et al. |
| 2014/0367871 A1 | 12/2014 | Govindan et al. |
| 2015/0013987 A1 | 1/2015 | Underwood et al. |
| 2015/0014248 A1 | 1/2015 | Herron et al. |
| 2015/0053619 A1 | 2/2015 | Cao et al. |
| 2015/0060286 A1 | 3/2015 | Govindan et al. |
| 2015/0060360 A1 | 3/2015 | Motherway et al. |
| 2015/0083577 A1 | 3/2015 | Govindan et al. |
| 2015/0083656 A1 | 3/2015 | Williams |
| 2015/0107840 A1 | 4/2015 | Ligthelm et al. |
| 2015/0107841 A1 | 4/2015 | Suijkerbuijk et al. |
| 2015/0129410 A1 | 5/2015 | Govindan et al. |
| 2015/0353397 A1 | 12/2015 | Cath et al. |
| 2016/0040522 A1 | 2/2016 | Jacob et al. |
| 2016/0137526 A1 | 5/2016 | Govindan et al. |
| 2016/0228795 A1 | 8/2016 | St. John et al. |
| 2016/0229705 A1 | 8/2016 | St. John et al. |
| 2016/0229714 A1 | 8/2016 | Thiel et al. |
| 2016/0244349 A1 | 8/2016 | St. John et al. |
| 2016/0339354 A1 | 11/2016 | Govindan et al. |
| 2016/0339356 A1 | 11/2016 | Govindan et al. |
| 2016/0339357 A1 | 11/2016 | Govindan et al. |
| 2017/0036171 A1 | 2/2017 | Lienhard et al. |
| 2017/0044033 A1 | 2/2017 | Lienhard et al. |
| 2017/0144906 A1 | 5/2017 | Andrews et al. |
| 2017/0174543 A1 | 6/2017 | Govindan et al. |
| 2017/0203977 A1 | 7/2017 | Govindan et al. |
| 2018/0008919 A1 | 1/2018 | Tierney, III et al. |
| 2018/0236372 A1 | 8/2018 | Govindan et al. |
| 2018/0236406 A1 | 8/2018 | St. John et al. |
| 2018/0244545 A1 | 8/2018 | St. John et al. |
| 2019/0002306 A1 | 1/2019 | Govindan et al. |

FOREIGN PATENT DOCUMENTS

| | | |
|---|---|---|
| CA | 2821453 C | 1/2014 |
| CA | 2816746 C | 4/2014 |
| CA | 2821458 C | 7/2014 |
| CN | 1623936 A | 6/2005 |
| CN | 1856447 A | 11/2006 |
| CN | 100999364 A | 7/2007 |
| CN | 101056693 A | 10/2007 |
| CN | 101397152 A | 4/2009 |
| CN | 101636354 A | 1/2010 |
| CN | 101717161 A | 6/2010 |
| CN | 102143786 A | 8/2011 |
| CN | 102438957 A | 5/2012 |
| CN | 102725236 A | 10/2012 |
| CN | 102933507 A | 2/2013 |
| DE | 2145861 A1 | 11/1972 |
| EP | 0 207 390 A1 | 1/1987 |
| EP | 0 253 287 A1 | 1/1988 |
| EP | 0 253 287 B1 | 9/1992 |
| EP | 0 623 561 A1 | 11/1994 |
| EP | 1775267 A2 | 4/2007 |
| FR | 1582201 A | 9/1969 |
| FR | 2561637 A1 | 9/1985 |
| GB | 821939 A | 10/1959 |
| GB | 1013767 A | 12/1965 |
| GB | 1036920 A | 7/1966 |
| GB | 1444241 A | 7/1976 |
| GB | 2395946 A | 6/2004 |
| JP | S55-147199 A | 11/1980 |
| JP | H05-208199 A | 8/1993 |
| KR | 101229482 B1 | 2/2013 |
| WO | WO 95/27683 A1 | 10/1995 |
| WO | WO 00/00273 A1 | 1/2000 |
| WO | WO 01/14256 A1 | 3/2001 |
| WO | WO 02/32813 A1 | 4/2002 |
| WO | WO 2005/012185 A1 | 2/2005 |
| WO | WO 2007/128062 A1 | 11/2007 |
| WO | WO 2007/132477 A1 | 11/2007 |
| WO | WO 2007/138327 A1 | 12/2007 |
| WO | WO 2007/144591 A1 | 12/2007 |
| WO | WO 2010/026589 A1 | 3/2010 |
| WO | WO 2010/118425 A1 | 10/2010 |
| WO | WO 2010/122336 A2 | 10/2010 |
| WO | WO 2010/131251 A2 | 11/2010 |
| WO | WO 2010/135561 A2 | 11/2010 |
| WO | WO 2011/159743 A1 | 12/2011 |
| WO | WO 2012/138502 A1 | 10/2012 |
| WO | WO 2012/142396 A1 | 10/2012 |
| WO | WO 2012/159203 A1 | 11/2012 |
| WO | WO 2013/012548 A1 | 1/2013 |
| WO | WO 2013/037047 A1 | 3/2013 |
| WO | WO 2013/043568 A1 | 3/2013 |
| WO | WO 2013/078124 A1 | 5/2013 |
| WO | WO 2013/158315 A1 | 10/2013 |
| WO | WO 2013/159220 A1 | 10/2013 |
| WO | WO 2014/058696 A1 | 4/2014 |
| WO | WO 2014/088826 A1 | 6/2014 |
| WO | WO 2014/121153 A2 | 8/2014 |
| WO | WO 2014/144778 A1 | 9/2014 |
| WO | WO 2014/150848 A1 | 9/2014 |
| WO | WO 2014/162094 A2 | 10/2014 |
| WO | WO 2014/188450 A1 | 11/2014 |
| WO | WO 2014/200829 A1 | 12/2014 |
| WO | WO 2015/021062 A1 | 2/2015 |
| WO | WO 2015/038983 A1 | 3/2015 |
| WO | WO 2015/042584 A1 | 3/2015 |
| WO | WO 2015/061194 A1 | 4/2015 |
| WO | WO 2017/030932 A1 | 2/2017 |
| WO | WO 2017/030937 A1 | 2/2017 |
| WO | WO 2017/030941 A1 | 2/2017 |
| WO | WO 2017/044645 A1 | 3/2017 |
| WO | WO 2017/044668 A1 | 3/2017 |
| WO | WO 2017/127607 A1 | 7/2017 |
| WO | WO 2017/147113 A1 | 8/2017 |

OTHER PUBLICATIONS

U.S. Appl. No. 14/719,239, filed May 21, 2015, Govindan et al.
U.S. Appl. No. 15/967,273, filed Apr. 30, 2018, Govindan et al.
U.S. Appl. No. 15/752,631, filed Feb. 14, 2018, Govindan et al.
U.S. Appl. No. 16/069,896, filed Jul. 13, 2018, Lam et al.
PCT/US2017/018808, May 4, 2017, International Search Report and Written Opinion.
PCT/US2017/018808, Sep. 7, 2018, International Preliminary Report on Patentability.
International Search Report and Written Opinion for PCT/US2017/018808 dated May 4, 2017.
International Preliminary Report on Patentability for PCT/US2017/018808 dated Sep. 7, 2018.
[No Author Listed], Accepta 4360 Material Safety Data Sheet. Accepta Ltd. Manchester, UK. Jul. 19, 2011. 5 pages.
[No Author Listed], Caustic Soda 50% Material Safety Data Sheet. Univar. Redmond, Washington. Apr. 8, 2013. 10 pages.
[No Author Listed], Color Removal Using Ozone. Spartan Environmental Technologies Air and Water Treatment—Technical Bulletin. Available Jul. 21, 2006. Last accessed Mar. 2, 2017 from <http://www.spartanwatertreatment.com/ozone-color-removal.html>. 2 pages.

(56) References Cited

OTHER PUBLICATIONS

[No Author Listed], Everything you want to know about Coagulation & Flocculation. Chapter 1: The Electrokinetic Connection. Zeta-Meter, Inc. Staunton, VA. 4th Edition. 1993:1-8.

[No Author Listed], Hi-Cal Hydrate Material Safety Data Sheet. Chemical Lime Co. Fort Worth, Texas. May 1, 2008. 6 pages.

[No Author Listed], Polyaluminum Chloride Solution Material Safety Data Sheet. GEO Specialty Chemicals, Ltd. Little Rock, Arkansas. Mar. 12, 2015. 11 pages.

[No Author Listed], Servco 1010 Material Safety Data Sheet. Servco Chemicals. Lubbock, Texas. Aug. 7, 2013. 4 pages.

[No Author Listed], Soda Ash Material Safety Data Sheet. Univar. Redmond, Washington. Apr. 7, 2003. 10 pages.

Akram et al., Energy Utilization of Brine from an MSF Desalination Plant by Pressure Retarded Osmosis. The International Desalination Association World Congress on Desalination and Water Reuse. Tianjin, China. Oct. 12, 2013. 12 pages.

Al-Hallaj et al., Solar desalination with a humidification-dehumidification cycle: performance of the unit. Desalination. 1998;120:273-80.

Alshakhs, Modifying Water Salinity to Improve Oil Recovery. Stanford Academic Report. Oct. 29, 2013. Last accessed on Dec. 8, 2016 at <http://large.stanford.edu/courses/2013/ph240/alshakhs1/>.

Aramco, Saudi Aramco's 'Smart Water' May Aid Oil Production. Rigzone. Jul. 29, 2009. <http://www.rigzone.com/news/article_pf.asp?a_id=78707> Last accessed Jul. 30, 2015. 1 page.

Arthur et al., Technical Summary of Oil & Gas Produced Water Treatment Technologies. All Consulting, LLC (Mar. 2005). Last accessed on Dec. 21, 2016 from <http://dvikan.no/ntnu-studentserver/reports/ALLConsulting-WaterTreatmentOptionsReport.pdf>. 53 pages.

Banchik et al., Thermodynamic Analysis of a Reverse Osmosis Desalination System Using Forward Osmosis for Energy Recovery. Proceedings of the ASME 2012 International Mechanical Engineering Congress & Exposition. American Society of Mechanical Engineers. Houston, Texas. Nov. 9-15, 2012. 13 pages.

Efraty et al., Closed circuit desalination—A new low energy high recovery technology without energy recovery. Desalination and Water Treatment. Jul. 31, 2011. 95-101.

El-Dessouky et al., Multiple-effect evaporation desalination systems: thermal analysis. Desalination. 1999;125:259-76.

Global Water Intelligence, Water Desalination Report. Tom Pankratz, ed. Dec. 17, 2012;48(48):1-4.

Govindan, Thermal Design of Humidification Dehumidification Systems for Affordable and Small-scale Desalination. Doctoral Thesis. Massachusetts Institute of Technology. Sep. 2012. 286 pages.

Huang et al., The bridging force between colloidal particles in a polyelectrolyte solution. Langmuir. Nov. 27, 2012;28(47):16300-5. doi: 10.1021/la303918p.

Khayet et al., Determination of surface and bulk pore sizes of flat-sheet and hollow-fiber membranes by atomic force microscopy, gas permeation and solute transport methods. Desalination. 2003;158:57-64.

Klausner et al., Evaporative heat and mass transfer for the diffusion driven desalination process. Heat Mass Transfer. 2006;42:528-36.

Kwak et al., New Insights on the Role of Multivalent Ions I Water-Carbonate Rock Interactions. Saudi Journal of Technology. 2014:25-38. Last accessed on Dec. 8, 2016 at <http://www.saudiaramco.com/content/dam/Publications/Journal-of-Technology/Summer2014/New_Insights.pdf>.

Li, Experimental Analysis of Produced Water Desalination by a Humidification-Dehumidification Process. 2009. 62 pages.

Li, Mineral precipitation and deposition in cooling systems using impaired waters: mechanisms, kinetics, and inhibition. Dissertation defended Jul. 27, 2010. 224 pages.

McGinnis et al., Pilot demonstration of the NH3/CO2 forward osmosis desalination process on high salinity brines. Desalination. Mar. 2013;312:67-74. Supporting information included.

Moghadasi et al., Scale deposits in porous media and their removal by EDTA injection. ECI Symposium Series. 2007. vol. RPS. Article 10. p. 57-70.

Narayan et al., The potential of solar-driven humidification-dehumidification desalination for small-scale decentralized water production. Renewable and Sustainable Energy Reviews. 2010;14:1187-1201.

Narayan et al., Thermal design of the humidification desalination system: an experimental investigation. International Journal of Heat and Mass Transfer. 2013;58:1-9.

Narayan et al., Thermodynamic balancing of the humidification dehumidification desalination system by mass extraction and injection. International Journal of Heat and Mass Transfer. 2013;57:756-70.

Sahin, A Mathematical Model for Explanation of Ion Exchange of the Boric Acid Adsorption. Jour. Chem. Soc. Pak. 1998;20(1):12-8.

SINEX, EDTA—A molecule with a complex story. University of Bristol, School of Chemistry. <www.chm.bris.ac.uk/motm/edta/edtah.htm> (accessed Jan. 8, 2013). Aug. 1, 2007. 6 pages.

Thiel et al., Hybridization of Humidification-Dehumidification and Pressure Retarded Osmosis for Brine Concentration Applications. The International Desalination Association World Congress on Desalination and Water Reuse. San Diego, California. Aug.-Sep. 2015. 8 pages.

Zamen et al., Improvement of solar humidification-dehumidification desalination using multi-stage process. 6 pages. Accessed Jun. 6, 2014.

U.S. Appl. No. 16/596,975, filed Oct. 9, 2019, Govindan et al.

\* cited by examiner

HYBRID DESALINATION SYSTEMS AND ASSOCIATED METHODS

RELATED APPLICATIONS

This application is a U.S. National Stage patent application based on International Application PCT/US2017/018808, filed Feb. 22, 2017, which claims priority under 35 U.S.C. § 119(e) to U.S. Provisional Application No. 62/298,332, filed Feb. 22, 2016, and entitled "Hybrid Desalination Systems and Associated Methods," each of which is incorporated herein by reference in its entirety for all purposes.

TECHNICAL FIELD

Systems and methods related to the desalination of aqueous streams comprising at least one salt and the production of saturated brines are generally described.

BACKGROUND

Desalination is a process by which an amount of at least one salt is removed from an aqueous stream. For example, seawater, brackish water, flowback water, industrial wastewater, and/or water produced from oil and gas extraction processes can be desalinated to produce fresh water suitable for human consumption, irrigation, and/or industrial use.

As the world's population has expanded, the demand for fresh water has increased. Desalination may play a role in satisfying this increased demand. In addition, desalination may play a role in recycling wastewater that has been produced by various human processes (e.g., industrial processes, oil and gas extraction processes), thereby mitigating the need to dispose of such wastewater. Accordingly, improved desalination systems and methods are desirable.

SUMMARY

Systems and methods related to the desalination of aqueous streams comprising at least one salt and the production of saturated brines are generally described. The subject matter of the present invention involves, in some cases, interrelated products, alternative solutions to a particular problem, and/or a plurality of different uses of one or more systems and/or articles.

Some aspects relate to a method for producing a concentrated brine stream. In some embodiments, the method comprises supplying a first liquid stream comprising water and at least one dissolved salt at an initial concentration to one or more first desalination units. In certain embodiments, the one or more first desalination units remove at least a portion of the water from the first liquid stream to produce a first concentrated brine stream comprising water and the at least one dissolved salt at a second concentration higher than the initial concentration of the first liquid stream. In some embodiments, the method further comprises supplying at least a portion of the first concentrated brine stream to a fluidic circuit that is downstream from the one or more first desalination units. In some embodiments, the fluidic circuit comprises one or more second desalination units. In certain embodiments, the one or more second desalination units remove at least a portion of the water from the first concentrated brine stream to produce a second concentrated brine stream comprising water and the at least one dissolved salt at a third concentration higher than the second concentration of the first concentrated brine stream. In some embodiments, the method further comprises recirculating the second concentrated brine stream through at least a portion of the fluidic circuit to remove at least a portion of the water from the second concentrated brine stream, forming a recirculated second concentrated brine stream comprising water and the at least one dissolved salt at a fourth concentration higher than the third concentration of the second concentrated brine stream. In some embodiments, the method further comprises discharging the recirculated second concentrated brine stream from the fluidic circuit when the recirculated second concentrated brine stream reaches a density of at least about 10 pounds per gallon.

Some aspects relate to a method for producing a concentrated brine stream. In some embodiments, the method comprises supplying a first liquid stream comprising water and at least one dissolved salt at an initial concentration to one or more first desalination units. In certain embodiments, the one or more first desalination units remove at least a portion of the water from the first liquid stream to produce a first concentrated brine stream comprising water and the at least one dissolved salt at a second concentration higher than the initial concentration of the first liquid stream. In some embodiments, the method further comprises supplying at least a portion of the first concentrated brine stream to a fluidic circuit that is downstream from the one or more first desalination units. In some embodiments, the fluidic circuit comprises one or more second desalination units. In certain embodiments, the one or more second desalination units remove at least a portion of the water from the first concentrated brine stream to produce a second concentrated brine stream comprising water and the at least one dissolved salt at a third concentration higher than the second concentration of the first concentrated brine stream. In some embodiments, the method further comprises recirculating the second concentrated brine stream through at least a portion of the fluidic circuit to remove at least a portion of the water from the second concentrated brine stream, forming a recirculated second concentrated brine stream comprising water and the at least one dissolved salt at a fourth concentration higher than the third concentration of the second concentrated brine stream. In some embodiments, the method further comprises discharging the recirculated second concentrated brine stream from the fluidic circuit when the salinity reaches at least about 25%.

Certain aspects relate to a system for producing a concentrated brine stream. In some embodiments, the system comprises at least one first desalination unit. In some embodiments, the system comprises at least one second desalination unit. In some embodiments, the system comprises a collection vessel configured to contain a quantity of a liquid. In certain embodiments, the collection vessel is in fluid communication with an outlet of the at least one first desalination unit and an inlet of the at least one second desalination unit.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
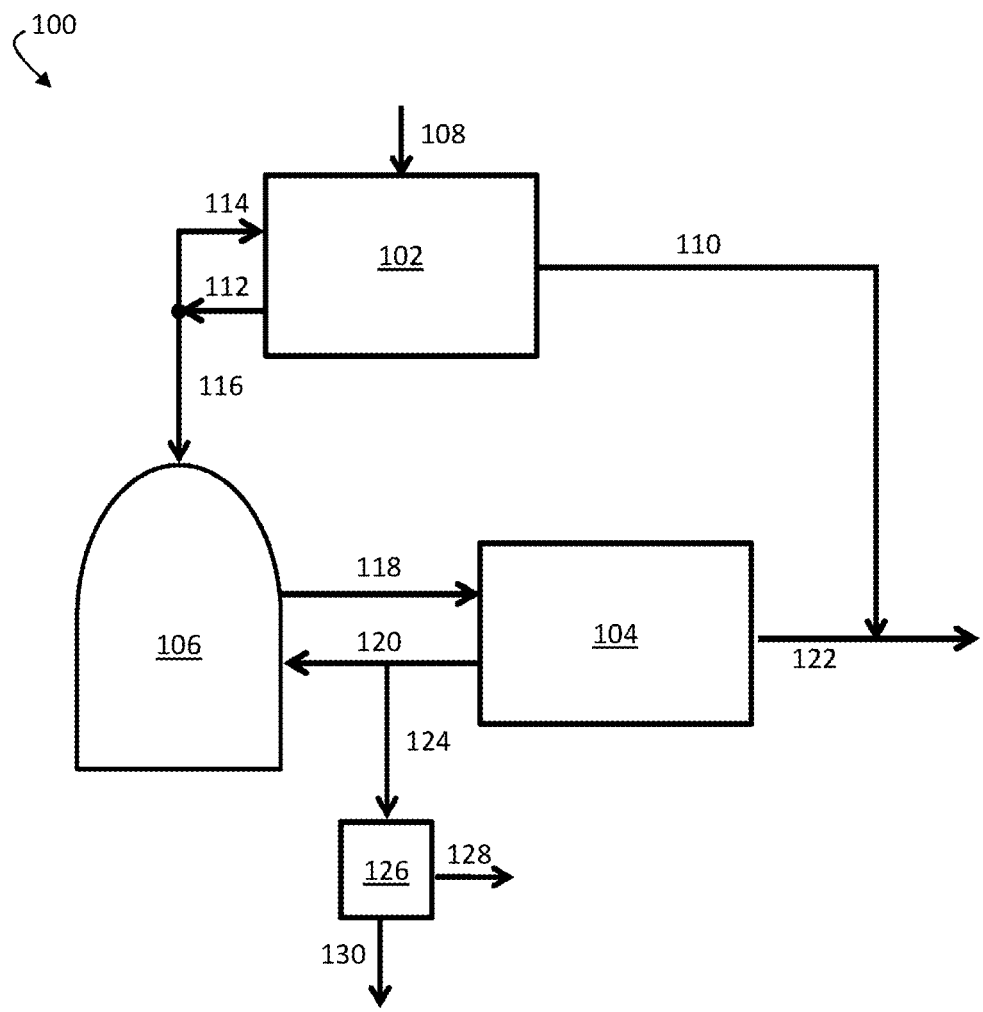
FIG. 1A shows a schematic illustration of an exemplary hybrid system comprising a first desalination unit and a fluidic circuit comprising a second desalination unit and a collection vessel.

Systems and methods related to desalination systems, including systems comprising one or more first desalination units and one or more second desalination units that may be operated partially or completely independently of each other and/or using different operating protocols or methodologies (e.g., steady-state versus transient, single-pass versus recycled, continuous versus batch/semi-batch, etc.—hereinafter also referred to as "hybrid systems"), are described herein. According to some embodiments, the one or more second desalination units are configured to desalinate higher salinity liquid streams than the one or more first desalination units. In some embodiments, the one or more second desalination units form a fluidic circuit that is located downstream from the one or more first desalination units. In certain embodiments, the one or more second desalination units are transiently operated and/or configured to facilitate transient operation. In certain embodiments, the one or more first desalination units are operated under steady-state conditions and/or configured to facilitate steady-state operation.

According to some embodiments, a liquid stream comprising water and at least one dissolved salt flows through one or more first desalination units, which are configured to remove at least a portion of the water from the liquid stream to produce a first concentrated brine stream enriched in the dissolved salt relative to the liquid stream. In some embodiments, at least a portion of the first concentrated brine stream is fed to a fluidic circuit comprising one or more second desalination units, which are configured to remove at least a portion of the water from the first concentrated brine stream to produce a second concentrated brine stream enriched in the dissolved salt relative to the first concentrated brine stream. In certain cases, the second concentrated brine stream is recirculated through at least a portion of the fluidic circuit (e.g., at least one of the second desalination units) until the recirculated second concentrated brine stream reaches a relatively high density (e.g., at least about 10 pounds per gallon) and/or a relatively high salinity (e.g., a total dissolved salt concentration of at least about 25 wt %). In certain embodiments, one or more additional salts are added to the recirculated concentrated brine stream to produce an ultra-high-density concentrated brine stream (e.g., a brine stream having a density of at least about 11.7 pounds per gallon). Some aspects relate to a system that is configured to promote energy efficiency by recovering heat from the recirculated concentrated brine stream.

As used herein, a transiently-operated desalination unit refers to a desalination unit in which a liquid stream is recirculated through the desalination unit until a certain condition is met (e.g., until the liquid stream reaches a certain density and/or salinity). Upon satisfaction of the condition, the liquid stream may be discharged from the desalination unit. In a transiently-operated desalination unit, certain characteristics (e.g., density, salinity, flow rate) of a stream flowing through the system may vary as a function of time. For example, the density and/or salinity of a liquid stream recirculating through a transiently-operated desalination unit may increase with each successive pass through the desalination unit. In contrast, a steady-state desalination unit refers to a desalination unit in which certain characteristics (e.g., density, salinity, flow rate) of a stream flowing through the unit are substantially constant over time. A desalination unit operated under steady-state conditions and/or configured to facilitate steady-state operation may be referred to as a steady-state desalination unit. In certain embodiments, a steady-state desalination unit may be continuously operated. A continuously-operated desalination unit generally refers to a desalination unit in which a liquid stream is fed to the desalination unit, desalinated, and subsequently discharged from the desalination unit without being recirculated. In certain other embodiments, at least a portion of a liquid stream in a steady-state desalination unit is recirculated through at least a portion of the steady-state desalination unit.

A transiently-operated desalination unit may be particularly well-suited for producing a concentrated brine stream (e.g., a brine stream having a relatively high density and/or salinity). In some cases, it may be advantageous for a desalination unit to produce concentrated brine, as the concentrated brine may be a highly desirable product that can be used in a variety of applications. For example, concentrated brine can be used in the oil and gas industry as a kill fluid (e.g., a high-density fluid placed in a wellbore to stop the flow of reservoir fluids) and/or as a drilling fluid (e.g., a fluid that assists in drilling a wellbore). In addition, concentrated brine can be used in the production of chemicals, textiles, and/or leather. In some cases, concentrated brine solutions can be used to de-ice roads, as such solutions may be capable of de-icing a road faster than a solid salt.

In addition, it may be advantageous for a desalination unit to produce concentrated brine not only because the concentrated brine is a valuable product, but because it avoids the need to dispose of the concentrated brine as a liquid waste stream. In some cases, disposal of liquid waste streams may be expensive and/or complicated. For example, one method of disposing of a liquid waste stream in an oilfield is deep well injection. Deep well injection sites often are expensive to drill, heavily taxed and regulated, and/or of limited capacity. Accordingly, in some cases it may be desirable to avoid the need to dispose of liquid waste streams or reduce the volume of such liquid waste streams requiring disposal.

Continuously-operated desalination units operating alone may be less suitable for producing concentrated brine or may be unable to produce concentrated brine without undesirable complications. For example, because concentrated brine solutions are generally near, at, or above the saturation limit, production of concentrated brine often results in the formation of salt crystals. The formation of salt crystals in a desalination unit may be deleterious, as the salt crystals may clog pumps, instruments, valves, and/or separation surfaces of the desalination unit.

However, a transiently-operated desalination unit may be capable of producing concentrated brine while eliminating or reducing at least some such complications. In a transiently-operated desalination unit, the concentration of one or more salts in a liquid stream circulating through the desalination unit generally varies over time. In some cases, the amount of time that a liquid stream having a relatively high concentration of one or more salts spends in a transiently-operated desalination unit (e.g., residence time) is less than the amount of time that an equivalent liquid stream would spend in a continuously-operated desalination unit seeking to produce concentrated brine. In certain embodiments, a liquid stream flowing through a transiently-operated desalination unit may have a relatively high flow velocity, which may inhibit formation of salt crystals. Accordingly, the probability of forming salt crystals within a desalination unit may be reduced in a transiently-operated desalination unit compared to a continuously-operated desalination unit. In addition, in some transiently-operated desalination units employed in the hybrid systems of the invention, fouling of the desalination unit by salt crystal formation may be avoided by following a period of high salinity operation with a period of low salinity operation. In some such transiently-operated desalination units, salt crystals that form during a period of high salinity operation may be dissolved during a period of low salinity operation.

In some cases, transient operation of a desalination unit to produce a concentrated brine stream may be associated with further advantages. For example, a transiently-operated desalination unit may have flexibility to produce a concentrated brine stream from a variety of types of feed streams. In the oil and gas industry, for example, one type of feed stream that may be encountered is produced water (e.g., water that emerges from oil or gas wells along with the oil or gas). Due to the length of time produced water has spent in the ground, and due to high subterranean pressures and temperatures that may increase the solubility of certain salts and minerals, produced water often comprises relatively high concentrations of dissolved salts and minerals. For example, some produced water streams may comprise a supersaturated solution of dissolved strontium sulfate ($SrSO_4$). In contrast, another type of feed stream that may be encountered in the oil and gas industry is flowback water (e.g., water that is injected as a fracking fluid during hydraulic fracturing operations and subsequently recovered). Flowback water often comprises a variety of constituents used in fracking, including surfactants, proppants, and viscosity reducing agents, but often has a lower salinity than produced water. In some cases, a transiently-operated desalination unit advantageously has the flexibility to produce concentrated brine from feed streams having different salinities. For example, in a transiently-operated desalination stream, a feed stream may be concentrated via successive passes through the desalination unit until a certain condition is met, regardless of the initial salinity of the feed stream.

Exemplary schematic desalination systems configured to be transiently operated to produce a concentrated brine stream are shown and described in commonly-owned U.S. patent application Ser. No. 14/719,189, filed May 21, 2015, and issued as U.S. Pat. No. 9,266,748 on Feb. 23, 2016, which is incorporated by reference.

In some cases, there may be advantages associated with coupling a transiently-operated desalination unit to one or more desalination units operated under different conditions (e.g., operated under steady-state conditions and/or continuously operated). For example, in some cases, a steady-state and/or continuously-operated desalination unit may be associated with certain advantages, such as operating simplicity, efficiency, and/or reliability. However, as noted above, a steady-state and/or continuously-operated desalination unit alone may be unable to produce concentrated brine without undesirable complications, such as formation of salt crystals. In some cases, a hybrid system comprising one or more steady-state and/or continuously-operated desalination units and one or more transiently-operated desalination units, where the hybrid system is configured such that the one or more steady-state and/or continuously-operated desalination units desalinate relatively low salinity liquid streams and the one or more transiently-operated desalination units desalinate relatively high salinity liquid streams, may benefit from the advantages associated with transiently-operated desalination units and the advantages associated with steady-state and/or continuously-operated desalination units. For example, the hybrid system may benefit from the higher efficiency and/or reliability of the steady-state and/or continuously-operated desalination units while also being able to produce a concentrated brine stream without deleterious salt crystal formation.

Accordingly, certain embodiments relate to a hybrid system for producing a concentrated brine stream. In some embodiments, the hybrid system comprises one or more first desalination units and one or more second desalination units. In some embodiments, the one or more second desalination units are configured to desalinate higher salinity liquid streams than the one or more first desalination units. According to some embodiments, the one or more second desalination units form a fluidic circuit that is located downstream from the one or more first desalination units.

In certain embodiments, the one or more first desalination units are operated under steady-state conditions and/or configured to facilitate steady-state operation. In certain cases, for example, the density, salinity, and/or flow rate of a liquid stream flowing through the one or more first desalination units may be substantially constant over time. In some embodiments, the percent change of a characteristic (e.g., density, salinity, flow rate) of a liquid stream flowing through the one or more first desalination units over a period of time (e.g., 24 hours, 12 hours, 1 hour, 30 minutes, 10 minutes, 5 minutes) is about 20% or less, about 10% or less, about 5% or less, about 2% or less, or about 1% or less.

In certain embodiments, the one or more first desalination units are continuously operated. In certain embodiments, at least a portion of a liquid stream is recycled through at least one of the one or more first desalination units.

The one or more first desalination units may independently be any type of suitable desalination unit. Examples of suitable desalination units include, but are not limited to, a humidification-dehumidification (HDH) desalination unit, a mechanical vapor compression unit, a multi-effect distillation unit, a multi-stage flash unit, and a vacuum distillation unit. In certain cases, at least one first desalination unit is an HDH desalination unit. In some embodiments, each first desalination unit is an HDH desalination unit.

In some cases, the one or more first desalination units form a single-pass fluidic pathway. As used herein, a "fluidic pathway" refers to a pathway comprising one or more fluidically interconnected units (e.g., a desalination unit, a pretreatment unit, a collection vessel) through which a liquid stream flows. In some embodiments, the fluidic pathway comprises one or more units fluidically interconnected in series and/or one or more units fluidically interconnected in parallel. In certain embodiments, the fluidic pathway is a single-pass fluidic pathway. As used herein, a "single-pass fluidic pathway" refers to a pathway having a starting point and an endpoint, where a liquid stream flows through the entire fluidic pathway (e.g., from the starting point to the end point) once (e.g., the liquid stream is not returned from the endpoint to the starting point and recirculated through the pathway).

In certain embodiments, the one or more second desalination units are transiently operated and/or configured to facilitate transient operation. In certain cases, for example, the density, salinity, and/or flow rate of a liquid stream flowing through the one or more second desalination units may vary with time. In some embodiments, the percent change of a characteristic (e.g., density, salinity, flow rate) of a liquid stream flowing through at least one of the one or more second desalination units over a period of time (e.g., 24 hours, 12 hours, 1 hour, 30 minutes, 10 minutes, 5 minutes) is at least about 1%, at least about 2%, at least about 5%, at least about 10%, or at least about 20%.

The one or more second desalination units may independently be any type of suitable desalination unit. Examples of suitable desalination units include, but are not limited to, an HDH desalination unit, a mechanical vapor compression unit, a multi-effect distillation unit, a multi-stage flash unit, and a vacuum distillation unit. In certain cases, at least one second desalination unit is an HDH desalination unit. In some embodiments, each second desalination unit is an HDH desalination unit.

In some embodiments, the one or more second desalination units form a fluidic circuit that is located downstream from the one or more first desalination units. As used herein, a "fluidic circuit" refers to a fluidic pathway comprising one or more units (e.g., a desalination unit, a pretreatment unit, a collection vessel) through which a liquid stream flows, where the liquid stream is recirculated through at least a portion of the pathway. In some embodiments, the density and/or salinity of a liquid stream recirculating through at least a portion of a fluidic circuit comprising one or more second desalination units may increase with each successive pass through the portion of the fluidic circuit.

FIG. 1A shows a schematic illustration of an exemplary hybrid system 100 comprising a first desalination unit 102 and a fluidic circuit (104, 120, 106, 118) comprising a second desalination unit 104 and an optional collection vessel 106. In certain embodiments, first desalination unit 102 is operated under steady-state conditions. In some embodiments, second desalination unit 104 is transiently operated. According to some embodiments, first desalination unit 102 and/or second desalination unit 104 are HDH desalination units. As shown in FIG. 1A, first desalination unit 102 and second desalination unit 104 may be fluidically connected to optional collection vessel 106. As illustrated, system 100 may further comprise a variety of fluid conduits, e.g., 108, 110, 112, 114, 116, 118, 120, 122, 124, 128, and 130 to facilitate operation and/or cleaning of hybrid system 100. In addition, system 100 may further comprise optional precipitation apparatus 126.

Although hybrid system 100 is illustrated in FIG. 1A as comprising optional collection vessel 106, it should be noted that in some embodiments, a hybrid system comprising one or more first desalination units and a fluidic circuit comprising one or more second desalination units does not comprise a collection vessel. In certain embodiments, for example, a first desalination unit is directly fluidically connected to a second desalination unit of the fluidic circuit.

In operation, a liquid stream comprising water and at least one dissolved salt at a first concentration may enter first desalination unit 102 through conduit 108. In first desalination unit 102, at least a portion of the water may be removed from the liquid stream, thereby producing a first substantially pure water stream and a first concentrated brine stream (i.e., a liquid stream comprising water and the at least one dissolved salt at a second concentration higher than the first concentration). The first substantially pure water stream may be discharged from first desalination unit 102 through conduit 110, and the first concentrated brine stream may be discharged from first desalination unit 102 through conduit 112. In certain embodiments, at least a first portion of the first concentrated brine stream may be reintroduced into first desalination unit 102 through an optional conduit 114. In some cases, at least a second portion of the first concentrated brine stream may be directed to flow to optional collection vessel 106 through conduit 116.

Once the first concentrated brine stream has entered collection vessel 106, the first concentrated brine stream may be directed to flow from collection vessel 106 to second desalination unit 104 through conduit 118. In second desalination unit 104, at least a portion of the water may be removed from the first concentrated brine stream, thereby producing a second substantially pure water stream and a second concentrated brine stream (i.e., a liquid stream comprising water and the at least one dissolved salt at a third concentration higher than the second concentration). The second substantially pure water stream may be discharged from second desalination unit 104 through conduit 122. The second concentrated brine stream may be recirculated through at least a portion of the fluidic circuit. In certain embodiments, the second concentrated brine stream may be recirculated through at least second desalination unit 104. In some embodiments, the second concentrated brine stream may be recirculated through the entire fluidic circuit (e.g., directed to flow through conduit 120, collection vessel 106, and conduit 118 back to second desalination unit 104). With each successive pass through second desalination unit 104, the density and/or salinity of the recirculated second concentrated brine stream may increase. In addition, with each successive pass through second desalination unit 104, additional amounts of substantially pure water may be produced and discharged from second desalination unit 104 through conduit 122. In some cases, concentrated brine supplied from first desalination unit 102 may replace the discharged substantially pure water and allow a substantially constant volume to be maintained within the fluidic circuit. The recirculated second concentrated brine stream may continue to recirculate through at least a portion of the fluidic circuit until a certain condition is met (e.g., until a certain density or salinity is reached). Upon satisfaction of the condition, the recirculated second concentrated brine stream may be discharged from the fluidic circuit through conduit 124.

In some embodiments, a hybrid system for producing a concentrated brine stream comprises a plurality of first desalination units and a fluidic circuit comprising a second desalination unit. In some cases, at least a portion of the first desalination units may be operated under steady-state conditions. In some embodiments, all of the first desalination units may be operated under steady-state conditions. In certain cases, the second desalination unit may be transiently operated.

In certain embodiments, at least two of the first desalination units are fluidically interconnected in series. In some embodiments, all of the first desalination units are fluidically interconnected in series. Accordingly, in some cases, the liquid stream entering each successive first desalination unit has a higher density and/or salinity than the liquid stream that entered the previous first desalination unit. In certain other embodiments, however, at least two of the first desalination units are fluidically interconnected in parallel. In some embodiments, all of the first desalination units are fluidically interconnected in parallel.

The plurality of first desalination units may include any number of desalination units. In some cases, the plurality of first desalination units comprises at least 2 first desalination units, at least 3 first desalination units, at least 4 first desalination units, at least 5 first desalination units, at least 10 first desalination units, at least 20 first desalination units, at least 50 first desalination units, or at least 100 first desalination units. In some embodiments, the plurality of first desalination units comprises between 2 and 5 first desalination units, between 2 and 10 first desalination units, between 2 and 20 first desalination units, between 2 and 50 first desalination units, between 2 and 100 first desalination units, between 10 and 20 first desalination units, between 10 and 50 first desalination units, between 10 and 100 first desalination units, or between 50 and 100 first desalination units.

In some embodiments, each first desalination unit receives a liquid stream having a relatively low salinity (e.g., to avoid formation of salt crystals). In some cases, each first desalination unit receives a liquid stream having a concentration of at least one dissolved salt (e.g., NaCl) of about 100,000 mg/L or less, about 75,000 mg/L or less, about 50,000 mg/L or less, about 25,000 mg/L or less, about 10,000 mg/L or less, about 5,000 mg/L or less, about 1,000 mg/L or less, about 750 mg/L or less, about 500 mg/L or less, about 250 mg/L or less, or about 100 mg/L or less. In certain cases, each first desalination unit receives a liquid stream having a concentration of at least one dissolved salt (e.g., NaCl) in the range of about 100 mg/L to about 500 mg/L, about 100 mg/L to about 1,000 mg/L, about 100 mg/L to about 5,000 mg/L, about 100 mg/L to about 10,000 mg/L, about 100 mg/L to about 50,000 mg/L, or about 100 mg/L to about 100,000 mg/L.

Figure 1B:
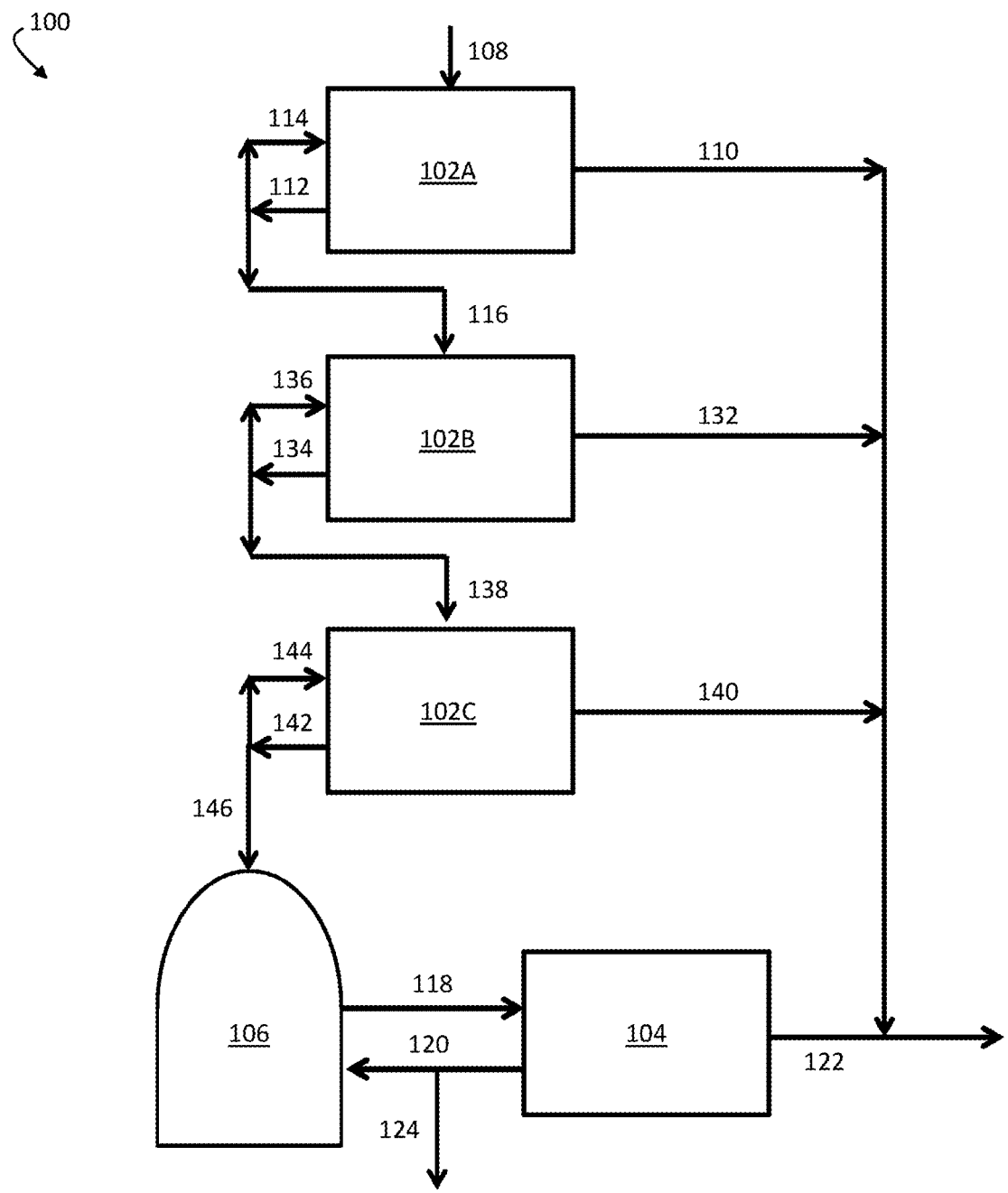
FIG. 1B shows a schematic illustration of an exemplary hybrid system comprising a plurality of first desalination units and a fluidic circuit comprising a second desalination unit and a collection vessel.

A schematic illustration of an exemplary hybrid system 100 comprising a plurality of first desalination units fluidically interconnected in series is shown in FIG. 1B. In FIG. 1B, hybrid system 100 comprises first desalination units 102A, 102B, and 102C. In some embodiments, first desalination units 102A, 102B, and/or 102C are steady-state desalination units. In addition to first desalination units 102A, 102B, and 102C, hybrid system 100 may further comprise a fluidic circuit comprising second desalination unit 104 and optional collection vessel 106. In some embodiments, second desalination unit 104 is a transiently-operated desalination unit. As shown in FIG. 1B, first desalination units 102A, 102B, and 102C and second desalination unit 104 may be fluidically connected to optional collection vessel 106. As illustrated, system 100 may further comprise fluid conduits 108, 110, 112, 114, 116, 118, 120, 122, 124, 132, 134, 136, 138, 140, 142, 144, and 146.

In operation, a liquid stream comprising water and at least one dissolved salt at a first concentration may enter first desalination unit 102A through conduit 108. In first desalination unit 102A, at least a portion of the water may be removed from the liquid stream, thereby producing a first substantially pure water stream and a first concentrated brine stream (i.e., a liquid stream comprising water and the at least one dissolved salt at a second concentration higher than the first concentration). The first substantially pure water stream may be discharged from first desalination unit 102A through conduit 110, and the first concentrated brine stream may be discharged from first desalination unit 102A through conduit 112. In some cases, at least a first portion of the first concentrated brine stream may be reintroduced into first desalination unit 102A through an optional conduit 114. In some cases, at least a second portion of the first concentrated brine stream may be directed to flow to first desalination unit 102B through conduit 116. In first desalination unit 102B, at least a portion of the water may be removed from the first concentrated brine stream, thereby producing a second substantially pure water stream and a second concentrated brine stream (i.e., a liquid stream comprising water and the at least one dissolved salt at a third concentration higher than the second concentration). The second substantially pure water stream may be discharged from first desalination unit 102B through conduit 132. In some cases, at least a first portion of the second concentrated brine stream may be reintroduced into first desalination unit 102B through an optional conduit 136. In some cases, at least a second portion of the second concentrated brine stream may be directed to flow to first desalination unit 102C through conduit 138. In first desalination unit 102C, at least a portion of the water may be removed from the second concentrated brine stream, thereby producing a third substantially pure water stream and a third concentrated brine stream (i.e., a liquid stream comprising water and the at least one dissolved salt at a fourth concentration higher than the third concentration). The third substantially pure water stream may be discharged from first desalination unit 102C through conduit 140. In some cases, at least a first portion of the third concentrated brine stream may be reintroduced into first desalination unit 102C through an optional conduit 144. In some cases, at least a second portion of the third concentrated brine stream may be directed to flow to optional collection vessel 106 of the fluidic circuit through conduit 146.

Once the third concentrated brine stream has entered the fluidic circuit, the third concentrated brine stream may be directed to flow from collection vessel 106 to second desalination unit 104 through conduit 118. In second desalination unit 104, at least a portion of the water may be removed from the third concentrated brine stream, thereby producing a fourth substantially pure water stream and a fourth concentrated brine stream (i.e., a liquid stream comprising water and the at least one dissolved salt at a fifth concentration higher than the fourth concentration). The fourth substantially pure water stream may be discharged from second desalination unit 104 through conduit 122.

The fourth concentrated brine stream may be recirculated through at least a portion of the fluidic circuit. In certain embodiments, the fourth concentrated brine stream may be recirculated through at least second desalination unit 104. In some embodiments, the fourth concentrated brine stream may be recirculated through the entire fluidic circuit (e.g., directed to flow through conduit 120, collection vessel 106, and conduit 118 back to second desalination unit 104). With each successive pass through second desalination unit 104, the density and/or salinity of the recirculated fourth concentrated brine stream may increase. In addition, with each successive pass through second desalination unit 104, additional amounts of substantially pure water may be produced and discharged from second desalination unit 104 through conduit 122. Concentrated brine supplied from first desalination unit 102C may replace the discharged substantially pure water and allow a substantially constant volume to be maintained within the fluidic circuit. The recirculated fourth concentrated brine stream may continue to recirculate through at least a portion of the fluidic circuit until a certain condition is met (e.g., until a certain density or salinity is reached). Upon satisfaction of the condition, the recirculated fourth concentrated brine stream may be discharged from the fluidic circuit through conduit 124.

In some embodiments, a hybrid system for producing a concentrated brine stream comprises a first desalination unit (e.g., a steady-state desalination unit) and a fluidic circuit comprising a plurality of second desalination units (e.g., transiently-operated desalination units). In certain embodiments, at least two of the second desalination units are fluidically interconnected in parallel. In some embodiments, all of the second desalination units are fluidically interconnected in parallel. Accordingly, in some cases, the liquid stream entering each second desalination unit has substantially the same density and/or salinity. In certain other embodiments, however, at least two of the second desalination units are fluidically interconnected in series. In some embodiments, all of the second desalination units are fluidically interconnected in series.

The plurality of second desalination units may include any number of second desalination units. In some cases, the plurality of second desalination units comprises at least 2 second desalination units, at least 3 second desalination units, at least 4 second desalination units, at least 5 second desalination units, at least 10 second desalination units, at least 20 second desalination units, at least 50 second desalination units, or at least 100 second desalination units. In some embodiments, the plurality of second desalination units comprises between 2 and 5 second desalination units, between 2 and 10 second desalination units, between 2 and 20 second desalination units, between 2 and 50 second desalination units, between 2 and 100 second desalination units, between 10 and 20 second desalination units, between 10 and 50 second desalination units, between 10 and 100 second desalination units, or between 50 and 100 second desalination units.

Figure 1C:
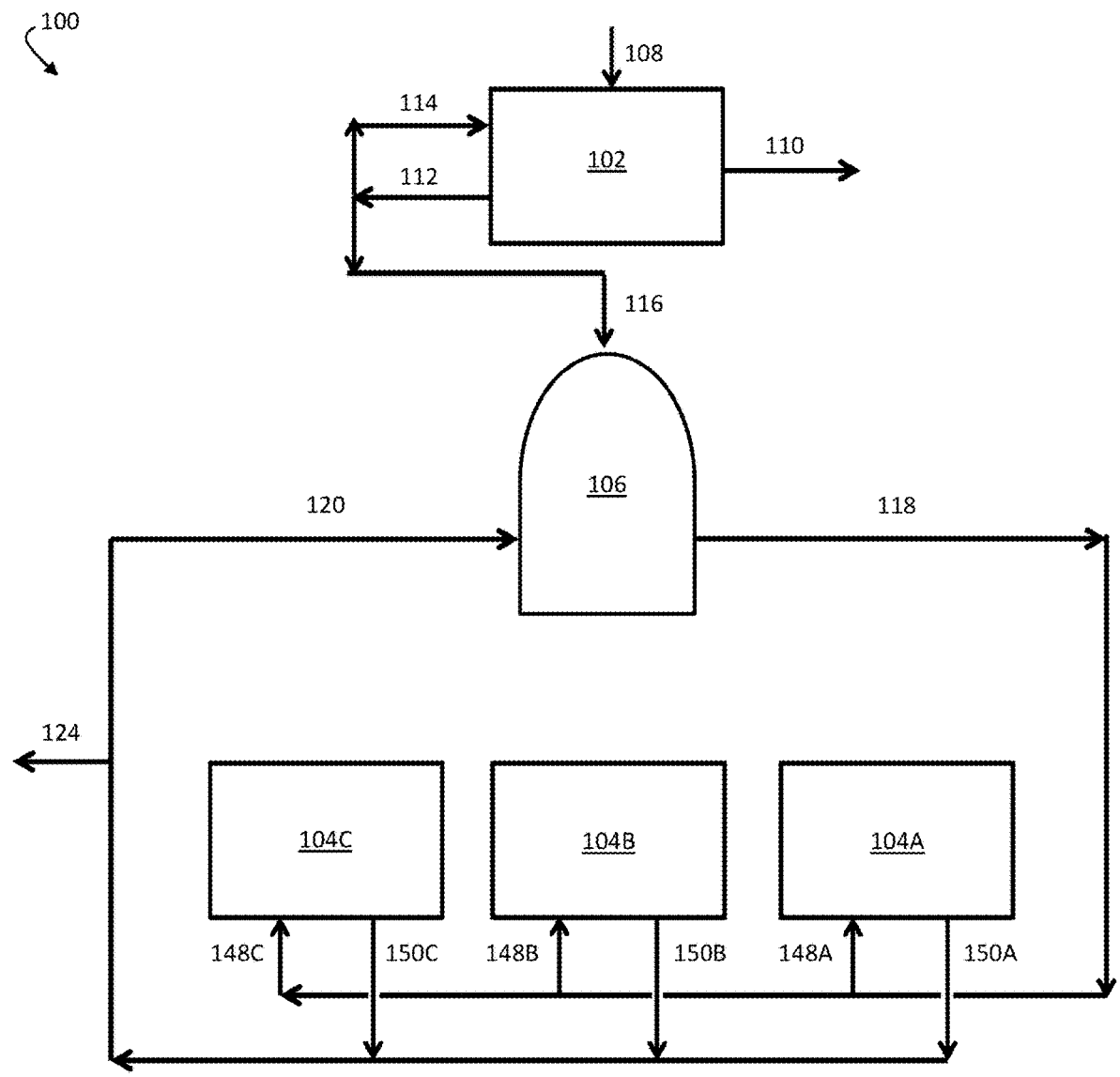
FIG. 1C shows a schematic illustration of an exemplary hybrid system comprising a first desalination unit and a fluidic circuit comprising a plurality of second desalination units and a collection vessel, where the hybrid system is configured for a liquid stream to be recirculated through the fluidic circuit.

A schematic illustration of an exemplary hybrid system 100 comprising a first desalination unit and a fluidic circuit comprising a plurality of second desalination units fluidically interconnected in parallel, where hybrid system 100 is configured for a liquid stream to be recirculated through the fluidic circuit, is shown in FIG. 1C. In FIG. 1C, hybrid system 100 comprises first desalination unit 102 and a fluidic circuit comprising optional collection vessel 106 and second desalination units 104A, 104B, and 104C. In operation, a liquid stream comprising water and at least one dissolved salt at a first concentration may enter first desalination unit 102 through conduit 108. In first desalination unit 102, at least a portion of the water may be removed from the liquid stream, thereby producing a first substantially pure water stream and a first concentrated brine stream (i.e., a liquid stream comprising water and at least one dissolved salt at a second concentration higher than the first concentration). The first substantially pure water stream may be discharged from first desalination unit 102 through conduit 110, and the first concentrated brine stream may be discharged from first desalination unit 102 through conduit 112. In some cases, at least a first portion of the first concentrated brine stream may be reintroduced into first desalination unit 102 through an optional conduit 114. In some cases, at least a second portion of the first concentrated brine stream may be directed to flow to optional collection vessel 106 through conduit 116.

The first concentrated brine stream may then be directed to flow from collection vessel 106 through conduit 118 to second desalination units 104A, 104B, and 104C. The first concentrated brine stream may enter second desalination unit 104A through conduit 148A, second desalination unit 104B through conduit 148B, and second desalination unit 104C through conduit 148C. In each of second desalination units 104A, 104B, and 104C, at least a portion of the water may be removed from the first concentrated brine stream, thereby producing second substantially pure water streams and second concentrated brine streams (i.e., liquid streams comprising water and the at least one dissolved salt at a third concentration higher than the second concentration). The second substantially pure water streams may be discharged from second desalination units 104A, 104B, and 104C (not shown in FIG. 1C) and may exit system 100. In some cases, concentrated brine supplied from first desalination unit 102 may replace the discharged substantially pure water and allow a substantially constant volume to be maintained within the fluidic circuit.

The second concentrated brine streams may be discharged from second desalination units 104A, 104B, and 104C through conduits 150A, 150B, and 150C, respectively. The discharged second concentrated brine streams may then be recirculated through the fluidic circuit (e.g., directed to flow through conduit 120, collection vessel 106, and conduit 118 back to second desalination units 104A, 104B, and/or 104C). The recirculated second concentrated brine stream may continue to be recirculated through the fluidic circuit until a certain condition (e.g., a target density and/or salinity) is satisfied. Once the specified condition is satisfied, the recirculated second concentrated brine stream may be discharged from the fluidic circuit through conduit 124.

Figure 1D:
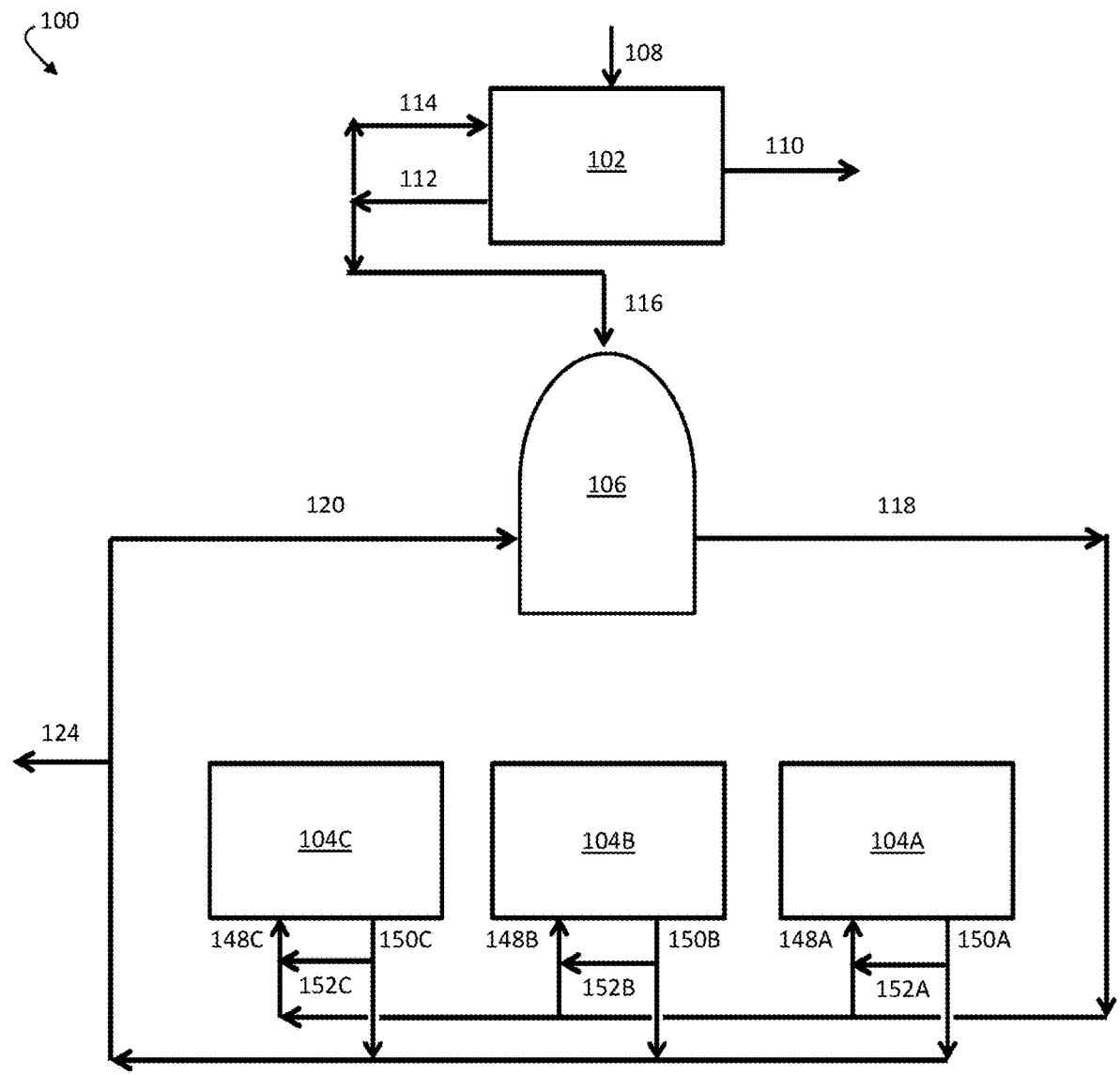
FIG. 1D shows a schematic illustration of an exemplary hybrid system comprising a first desalination unit and a fluidic circuit comprising a plurality of second desalination units and a collection vessel, where the hybrid system is configured for a liquid stream to be recirculated through at least a portion of the fluidic circuit (e.g., the hybrid system may be configured such that a first portion of the liquid stream is recirculated through a first second desalination unit, a second portion of the liquid stream is recirculated through a second desalination unit, and a third portion of the liquid stream is recirculated through a third second desalination unit)

A schematic illustration of an exemplary hybrid system 100 comprising a first desalination unit 102 and a fluidic circuit comprising an optional collection vessel 106 and a plurality of second desalination units 104A, 104B, and 104C fluidically interconnected in parallel, where hybrid system 100 is configured for a liquid stream to be recirculated through at least a portion of the fluidic circuit, is shown in FIG. 1D.

In operation, first desalination unit 102 shown in FIG. 1D may operate as in FIG. 1C. As in FIG. 1C, the first concentrated brine stream produced by first desalination unit 102 may be directed to flow to optional collection vessel 106 through conduit 116, and the first concentrated brine stream may then be directed to flow from collection vessel 106 through conduit 118 to second desalination units 104A, 104B, and 104C through conduits 148A, 148B, and 148C respectively. In each of second desalination units 104A, 104B, and 104C, at least a portion of the water may be removed from the first concentrated brine stream, thereby producing second substantially pure water streams and second concentrated brine streams (i.e., liquid streams comprising water and the at least one dissolved salt at a third concentration higher than the second concentration). The second substantially pure water streams may be discharged from second desalination units 104A, 104B, and 104C (not shown in FIG. 1D) and may exit system 100. In some cases, concentrated brine supplied from first desalination unit 102 may replace the discharged substantially pure water and allow a substantially constant volume to be maintained within the fluidic circuit. Instead of discharging the second concentrated brine streams from the second desalination units at that point, however, each of the second concentrated brine streams may be recirculated within the second desalination units (e.g., through conduits 152A, 152B, or 152C) until a certain condition (e.g., a target density and/or salinity) is satisfied. Once the specified condition is satisfied, the recirculated second concentrated brine streams may be discharged from second desalination units 104A, 104B, and 104C through conduits 150A, 150B, and 150C, respectively. In some cases, the recirculated second concentrated brine stream may then be discharged from the fluidic circuit through conduit 124. In some cases, the recirculated second concentrated brine stream may be returned to collection vessel 106 through conduit 120. In certain cases, the recirculated second concentrated brine stream may be further recirculated through desalination units 104A, 104B, and 104C.

In some embodiments, a hybrid system for producing a concentrated brine stream may comprise a plurality of first desalination units and a fluidic circuit comprising a plurality of second desalination units. In some cases, at least some of the first desalination units are fluidically interconnected in series, and at least some of the second desalination units are fluidically interconnected in parallel. In certain embodiments, all of the first desalination units are fluidically interconnected in series, and all of the second desalination units are fluidically interconnected in parallel.

Figure 1E:
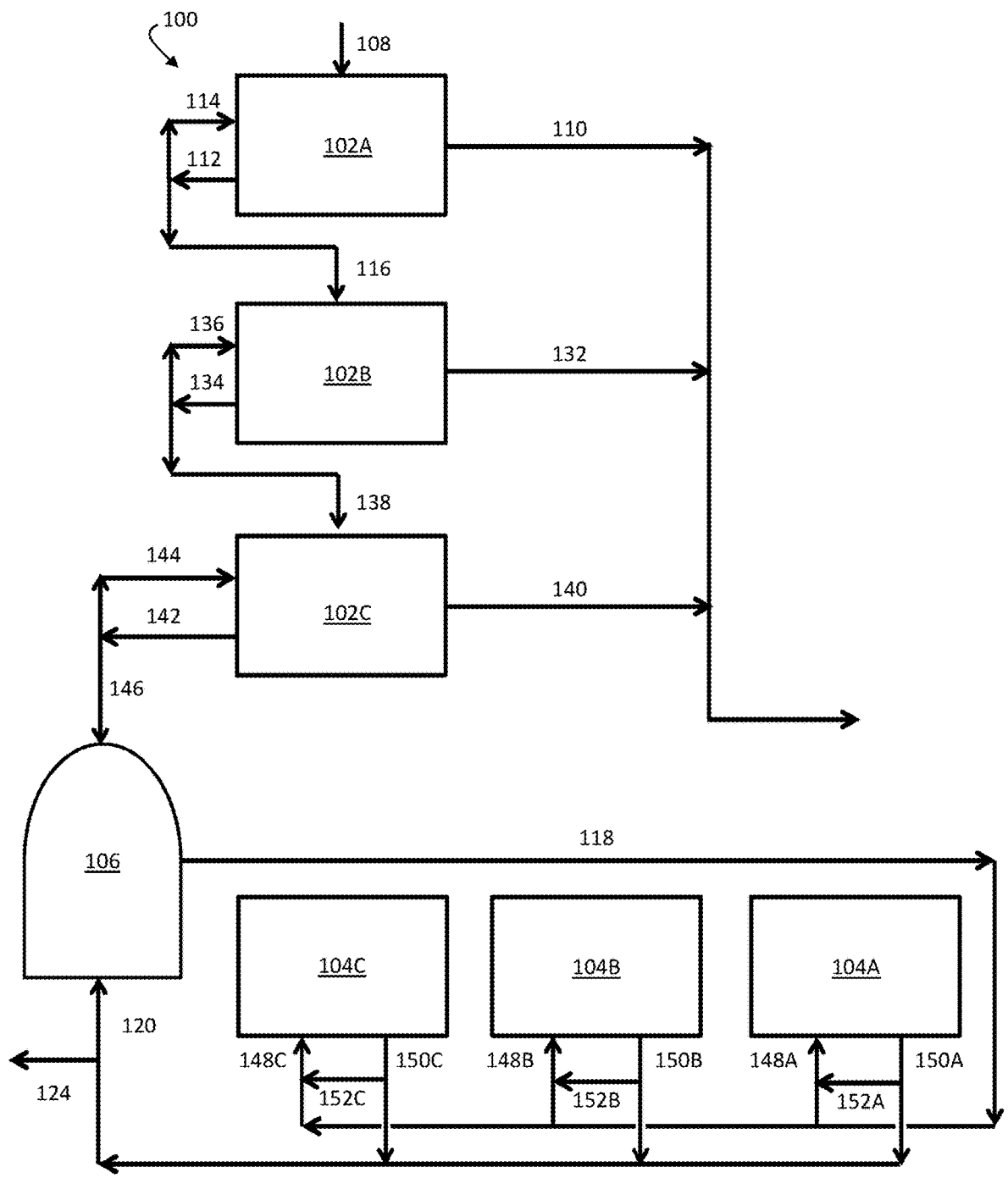
FIG. 1E shows a schematic illustration of an exemplary hybrid system comprising a plurality of first desalination units and a fluidic circuit comprising a plurality of second desalination units and a collection vessel.

A schematic illustration of an exemplary hybrid system 100 comprising a plurality of first desalination units fluidically interconnected in series and a fluidic circuit comprising a plurality of second desalination units fluidically interconnected in parallel is shown in FIG. 1E. In FIG. 1E, hybrid system 100 comprises first desalination units 102A, 102B, and 102C and a fluidic circuit comprising second desalination units 104A, 104B, and 104C. As shown in FIG. 1E, first desalination units 102A, 102B, and 102C may be fluidically connected to second desalination units 104A, 104B, and 104C through conduit 146 and optional collection vessel 106.

In operation, a liquid stream comprising water and at least one dissolved salt at a first concentration may enter first desalination unit 102A through conduit 108. In first desalination unit 102A, at least a portion of the water may be removed from the liquid stream, thereby producing a first substantially pure water stream and a first concentrated brine stream (i.e., a liquid stream comprising water and the at least one dissolved salt at a second concentration higher than the first concentration). The first substantially pure water stream may be discharged from first desalination unit 102A through conduit 110, and the first concentrated brine stream may be discharged from first desalination unit 102A through conduit 112. In some cases, at least a first portion of the first concentrated brine stream may be reintroduced into first desalination unit 102A through an optional conduit 114. In some cases, at least a second portion of the first concentrated brine stream may be directed to flow to first desalination unit 102B through conduit 116. In first desalination unit 102B, at least a portion of the water may be removed from the first concentrated brine stream, thereby producing a second substantially pure water stream and a second concentrated brine stream (i.e., a liquid stream comprising water and the at least one dissolved salt at a third concentration higher than the second concentration). The second substantially pure water stream may be discharged from first desalination unit 102B through conduit 132. In some cases, at least a first portion of the second concentrated brine stream may be reintroduced into first desalination unit 102B through an optional conduit 136. In some cases, at least a second portion of the second concentrated brine stream may be directed to flow to first desalination unit 102C through conduit 138. In first desalination unit 102C, at least a portion of the water may be removed from the second concentrated brine stream, thereby producing a third substantially pure water stream and a third concentrated brine stream (i.e., a liquid stream comprising water and the at least one dissolved salt at a fourth concentration higher than the third concentration). The third substantially pure water stream may be discharged from first desalination unit 102C through conduit 140. In some cases, at least a first portion of the third concentrated brine stream may be reintroduced into first desalination unit 102C through an optional conduit 144. In some cases, at least a second portion of the third concentrated brine stream may be directed to flow to optional collection vessel 106 through conduit 146.

The third concentrated brine stream may subsequently be directed to flow from collection vessel 106 through conduit 118 to second desalination units 104A, 104B, and 104C. The third concentrated brine stream may enter second desalination unit 104A through conduit 148A, second desalination unit 104B through conduit 148B, and second desalination unit 104C through conduit 148C. In each of second desalination units 104A, 104B, and 104C, at least a portion of the water may be removed from the third concentrated brine stream, thereby producing fourth substantially pure water streams and fourth concentrated brine streams (i.e., liquid streams comprising water and at least one dissolved salt at a fifth concentration higher than the fourth concentration). The fourth substantially pure water streams may be discharged from each second desalination unit (not shown in FIG. 1E).

In some embodiments, the fourth concentrated brine streams may be discharged from second desalination units 104A, 104B, and 104C through conduits 150A, 150B, and 150C, respectively. The discharged fourth concentrated brine streams may then be recirculated through the fluidic circuit (e.g., directed to flow through conduit 120, collection vessel 106, and conduit 118 back to second desalination units 104A, 104B, and/or 104C). The recirculated fourth concentrated brine stream may continue to be recirculated through the fluidic circuit until a certain condition (e.g., a target density and/or salinity) is satisfied. Once the specified condition is satisfied, the recirculated second concentrated brine stream may be discharged from the fluidic circuit through conduit 124.

In some cases, instead of being discharged from second desalination units 104A, 104B, and 104C, the fourth concentrated brine streams may be recirculated through each of second desalination units 104A, 104B, and 104C (e.g., through conduits 152A, 152B, and 152C) until a certain condition (e.g., a target density and/or salinity) is satisfied. In some cases, make-up brine streams may be supplied to desalination units 104A, 104B, and 104C (e.g., through conduits 148A, 148B, and 148C) to maintain a constant volume within the second desalination units. Once the specified condition is satisfied, the recirculated fourth concentrated brine streams may be discharged from desalination units 104A, 104B, and 104C through conduits 150A, 150B, and 150C. In some cases, the recirculated fourth concentrated brine streams may be discharged from hybrid system 100 through conduit 124. In some cases, the recirculated fourth concentrated brine streams may be returned to collection vessel 106 through conduit 120. In certain cases, the recirculated fourth concentrated brine streams may be further recirculated through desalination units 104A, 104B, and 104C.

It should be understood that the inventive systems and methods described herein are not limited to those including desalination units. For example, in certain embodiments, only a portion of a desalination unit (e.g., a humidifier) may be employed.

The liquid stream comprising water and at least one dissolved salt fed to the systems of the invention for producing a concentrated brine stream can originate from a variety of sources. For example, in certain embodiments, at least a portion of a liquid stream that enters a hybrid system for producing a concentrated brine stream comprises and/or is derived from seawater, produced water, flowback water, ground water, brackish water, and/or wastewater (e.g., industrial wastewater). Non-limiting examples of wastewater include textile mill wastewater, leather tannery wastewater, paper mill wastewater, cooling tower blowdown water, flue gas desulfurization wastewater, landfill leachate water, and/or the effluent of a chemical process (e.g., the effluent of another desalination system and/or a chemical process). As described in further detail herein, at least a portion of the liquid stream may be pretreated to remove at least a portion of one or more components (e.g., a scaling ion, a water-immiscible material, a suspended solid, and/or a volatile organic material).

According to some embodiments, the liquid stream fed to the hybrid system for producing a concentrated brine stream comprises water and at least one dissolved salt at an initial concentration. A dissolved salt generally refers to a salt that has been solubilized to such an extent that the component ions of the salt are no longer ionically bonded to each other. In certain embodiments, at least one dissolved salt in the liquid stream is a monovalent salt. As used herein, the term "monovalent salt" refers to a salt that includes a monovalent cation (e.g., a cation with a redox state of +1 when solubilized). Examples of monovalent salts include, but are not limited to, salts containing sodium, potassium, lithium, rubidium, cesium, and francium. In certain embodiments, the monovalent salts include monovalent anions comprising, for example, chlorine, bromine, fluorine, and iodine. Non-limiting examples of monovalent salts include sodium chloride (NaCl), sodium bromide (NaBr), potassium chloride (KCl), potassium bromide (KBr), sodium carbonate, ($Na_2CO_3$), and sodium sulfate ($Na_2SO_4$). In some cases, at least one salt is a divalent salt. As used herein, the term "divalent salt" refers to a salt that includes a divalent cation (e.g., a cation with a redox state of +2 when solubilized). Non-limiting examples of divalent salts include calcium chloride ($CaCl_2$), calcium sulfate ($CaSO_4$), magnesium sulfate ($MgSO_4$), strontium sulfate ($SrSO_4$), barium sulfate ($BaSO_4$), and barium-strontium sulfate ($BaSr(SO_4)_2$). In some cases, at least one salt in the liquid stream is a trivalent salt (e.g., a salt that includes a trivalent cation having a redox state of +3 when solubilized) or a tetravalent salt (e.g., a salt that includes a tetravalent cation having a redox state of +4 when solubilized). Non-limiting examples of trivalent salts or tetravalent salts that may be present in certain liquid streams include iron (III) hydroxide ($Fe(OH)_3$), iron (III) carbonate ($Fe_2(CO_3)_3$), aluminum hydroxide ($Al(OH)_3$), aluminum carbonate ($Al_2(CO_3)_3$), boron salts, and/or silicates.

The liquid stream fed to the hybrid system for producing a concentrated brine stream may have any initial salinity. As used herein, the salinity of a liquid stream refers to the weight percent (wt %) of all dissolved salts in the liquid stream. In some embodiments, the liquid stream has a salinity of at least about 1%, at least about 5%, at least about 10%, at least about 15%, at least about 20%, at least about 25%, at least about 26%, at least about 27%, at least about 28%, at least about 29%, or at least about 30% (and/or, in certain embodiments, up to the solubility limit of the dissolved salt(s) in the liquid stream). In some embodiments, the liquid stream has a salinity of about 30% or less, about 29% or less, about 28% or less, about 27% or less, about 26% or less, about 25% or less, about 20% or less, about 15% or less, about 10% or less, about 5% or less, or about 1% or less. Combinations of the above-noted ranges are also possible. For example, in some embodiments, the liquid stream may have a salinity in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 25 wt % to about 26 wt %, about 25 wt % to about 27 wt %, about 25 wt % to about 28 wt %, about 25 wt % to about 29 wt %, or about 25 wt % to about 30 wt %. Salinity may be measured according to any method known in the art. For example, a non-limiting example of a suitable method for measuring salinity is the SM 2540C method. According to the SM 2540C method, a sample comprising an amount of liquid comprising one or more dissolved solids is filtered (e.g., through a glass fiber filter), and the filtrate is evaporated to dryness in a weighed dish at 180° C. The increase in dish weight represents the mass of the total dissolved solids in the sample. The salinity of the sample may be obtained by dividing the mass of the total dissolved solids by the mass of the original sample and multiplying the resultant number by 100.

According to some embodiments, the initial concentration of at least one dissolved salt (e.g., NaCl) in a liquid stream fed to a system of the invention for producing a concentrated brine stream is relatively high. In some embodiments, the initial concentration of at least one dissolved salt (e.g., NaCl) in the liquid stream fed to a hybrid system for producing a concentrated brine stream is at least about 100 mg/L, at least about 200 mg/L, at least about 500 mg/L, at least about 1,000 mg/L, at least about 2,000 mg/L, at least about 5,000 mg/L, at least about 10,000 mg/L, at least about 20,000 mg/L, at least about 50,000 mg/L, at least about 75,000 mg/L, or at least about 100,000 mg/L, at least about 102,000 mg/L, at least about 110,000 mg/L, at least about 120,000 mg/L, at least about 150,000 mg/L, at least about 175,000 mg/L, at least about 200,000 mg/L, at least about 210,000 mg/L, at least about 219,000 mg/L, at least about 220,000 mg/L, at least about 250,000 mg/L, at least about 275,000 mg/L, at least about 300,000 mg/L, at least about 310,000 mg/L, at least about 312,000 mg/L, at least about 320,000 mg/L, at least about 350,000 mg/L, or at least about 375,000 mg/L (and/or, in certain embodiments, up to the solubility limit of the salt in the liquid stream). In some embodiments, the initial concentration of at least one dissolved salt in the liquid stream is in the range of about 100 mg/L to about 375,000 mg/L, about 1,000 mg/L to about 10,000 mg/L, about 1,000 mg/L to about 50,000 mg/L, about 1,000 mg/L to about 75,000 mg/L, about 1,000 mg/L to about 100,000 mg/L, about 1,000 mg/L to about 150,000 mg/L, about 1,000 mg/L to about 200,000 mg/L, about 1,000 mg/L to about 250,000 mg/L, about 1,000 mg/L to about 300,000 mg/L, about 1,000 mg/L to about 350,000 mg/L, about 1,000 mg/L to about 375,000 mg/L, about 10,000 mg/L to about 50,000 mg/L, about 10,000 mg/L to about 75,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 375,000 mg/L, about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 375,000 mg/L, about 100,000 mg/L to about 150,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 375,000 mg/L, about 102,000 mg/L to about 219,000 mg/L, about 102,000 mg/L to about 312,000 mg/L, about 150,000 mg/L to about 200,000 mg/L, about 150,000 mg/L to about 250,000 mg/L, about 150,000 mg/L to about 300,000 mg/L, about 150,000 mg/L to about 350,000 mg/L, about 150,000 mg/L to about 375,000 mg/L, about 200,000 mg/L to about 250,000 mg/L, about 200,000 mg/L to about 300,000 mg/L, about 200,000 mg/L to about 350,000 mg/L, about 200,000 mg/L to about 375,000 mg/L, about 250,000 mg/L to about 300,000 mg/L, about 250,000 mg/L to about 350,000 mg/L, about 250,000 mg/L to about 375,000 mg/L, about 300,000 mg/L to about 350,000 mg/L, or about 300,000 mg/L to about 375,000 mg/L. The concentration of a dissolved salt generally refers to the combined concentrations of the cation and anion of the salt. For example, the concentration of dissolved NaCl would refer to the sum of the concentration of sodium ions (Na$^+$) and the concentration of chloride ions (Cl$^-$). The concentration of a dissolved salt may be measured according to any method known in the art. For example, suitable methods for measuring the concentration of a dissolved salt include inductively coupled plasma (ICP) spectroscopy (e.g., inductively coupled plasma optical emission spectroscopy). As one non-limiting example, an Optima 8300 ICP-OES spectrometer may be used.

In some embodiments, the liquid stream fed to the hybrid system for producing a concentrated brine stream comprises at least one dissolved salt (e.g., NaCl) in an amount of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, or at least about 30 wt % (and/or, in certain embodiments, up to the solubility limit of the salt in the liquid stream). In some embodiments, the liquid stream fed to the hybrid system for producing a concentrated brine stream comprises at least one dissolved salt in an amount in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 25 wt % to about 26 wt %, about 25 wt % to about 27 wt %, about 25 wt % to about 28 wt %, about 25 wt % to about 29 wt %, or about 25 wt % to about 30 wt %.

In some embodiments, the initial total dissolved salt concentration of the liquid stream fed to the hybrid system for producing a concentrated brine stream may be relatively high. The total dissolved salt concentration generally refers to the combined concentrations of all the cations and anions of dissolved salts (e.g., monovalent, divalent, trivalent, and/or tetravalent salts) present in the liquid stream. As a simple, non-limiting example, in a water stream comprising dissolved NaCl and dissolved MgSO$_4$, the total dissolved salt concentration would refer to the total concentrations of the Na$^+$, Cl$^-$, Me$^{2+}$, and SO$_4^2$ ions. In certain cases, the initial total dissolved salt concentration of the liquid stream fed to the system for producing a concentrated brine stream is at least about 1,000 mg/L, at least about 2,000 mg/L, at least about 5,000 mg/L, at least about 10,000 mg/L, at least about 20,000 mg/L, at least about 50,000 mg/L, at least about 75,000 mg/L, at least about 100,000 mg/L, at least about 110,000 mg/L, at least about 120,000 mg/L, at least about 150,000 mg/L, at least about 175,000 mg/L, at least about 200,000 mg/L, at least about 210,000 mg/L, at least about 220,000 mg/L, at least about 250,000 mg/L, at least about 275,000 mg/L, at least about 300,000 mg/L, at least about 310,000 mg/L, at least about 320,000 mg/L, at least about 350,000 mg/L, at least about 375,000 mg/L, at least about 400,000 mg/L, at least about 450,000 mg/L, or at least about 500,000 mg/L (and/or, in certain embodiments, up to the solubility limit of the dissolved salt(s) in the liquid stream). In some embodiments, the initial total dissolved salt concentration of the liquid stream is in the range of about 1,000 mg/L to about 10,000 mg/L, about 1,000 mg/L to about 20,000 mg/L, about 1,000 mg/L to about 50,000 mg/L, about 1,000 mg/L to about 75,000 mg/L, about 1,000 mg/L to about 100,000 mg/L, about 1,000 mg/L to about 150,000 mg/L, about 1,000 mg/L to about 200,000 mg/L, about 1,000 mg/L to about 250,000 mg/L, about 1,000 mg/L to about 300,000 mg/L, about 1,000 mg/L to about 350,000 mg/L, about 1,000 mg/L to about 400,000 mg/L, about 1,000 mg/L to about 450,000 mg/L, about 1,000 mg/L to about 500,000 mg/L, about 10,000 mg/L to about 20,000 mg/L, about 10,000 mg/L to about 50,000 mg/L, about 10,000 mg/L to about 75,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 400,000 mg/L, about 10,000 mg/L to about 450,000 mg/L, about 10,000 mg/L to about 500,000 mg/L, about 20,000 mg/L to about 50,000 mg/L, about 20,000 mg/L to about 75,000 mg/L, about 20,000 mg/L to about 100,000 mg/L, about 20,000 mg/L to about 150,000 mg/L, about 20,000 mg/L to about 200,000 mg/L, about 20,000 mg/L to about 250,000 mg/L, about 20,000 mg/L to about 300,000 mg/L, about 20,000 mg/L to about 350,000 mg/L, about 20,000 mg/L to about 400,000 mg/L, about 20,000 mg/L to about 450,000 mg/L, about 20,000 mg/L to about 500,000 mg/L about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 400,000 mg/L, about 50,000 mg/L to about 450,000 mg/L, about 50,000 mg/L to about 500,000 mg/L, about 100,000 mg/L to about 150,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 400,000 mg/L, about 100,000 mg/L to about 450,000 mg/L, or about 100,000 mg/L to about 500,000 mg/L. Total dissolved salt concentration may be measured according to any method known in the art. For example, a non-limiting example of a suitable method for measuring total dissolved salt concentration is the SM 2540C method. According to the SM 2540C method, a sample comprising an amount of liquid comprising one or more dissolved solids is filtered (e.g., through a glass fiber filter), and the filtrate is evaporated to dryness in a weighed dish at 180° C. The increase in dish weight represents the mass of the total dissolved solids in the sample. The total dissolved salt concentration of the sample may be obtained by dividing the mass of the total dissolved solids by the volume of the original sample.

In some embodiments, the liquid stream comprising water and at least one dissolved salt initially fed to a system for producing a concentrated brine stream of the invention is made to flow through at least a portion of one or more desalination units (e.g., units configured to remove at least a portion of at least one salt from an aqueous stream). According to certain embodiments, at least one of the desalination units (e.g., at least one of the first desalination units and/or at least one of the second desalination units) is a thermal desalination unit. In some cases, at least one of the desalination units (e.g., at least one of the first desalination units and/or at least one of the second desalination units) is a humidification-dehumidification (HDH) desalination unit. An HDH desalination unit generally refers to a unit comprising a humidifier and a dehumidifier. In some embodiments, the humidifier is configured to receive a liquid feed stream comprising water and at least one dissolved salt and to transfer at least a portion of the water from the liquid feed stream to a carrier gas through an evaporation process, thereby producing a humidified gas stream and a concentrated brine stream. In certain embodiments, the carrier gas comprises a non-condensable gas. Non-limiting examples of suitable non-condensable gases include air, nitrogen, oxygen, helium, argon, carbon monoxide, carbon dioxide, sulfur oxides ($SO_x$) (e.g., $SO_2$, $SO_3$), and/or nitrogen oxides ($NO_x$) (e.g., NO, $NO_2$). In some embodiments, the dehumidifier is configured to receive the humidified gas stream from the humidifier and to transfer at least a portion of water from the humidified gas stream to a stream comprising substantially pure water through a condensation process. Exemplary HDH desalination units that are suitable in the context of the present invention are shown and described in commonly-owned U.S. patent application Ser. No. 14/538,619, filed Nov. 11, 2014, and issued as U.S. Pat. No. 9,079,117 on Jul. 14, 2015; U.S. patent application Ser. No. 14/719,189, filed May 21, 2015, and issued as U.S. Pat. No. 9,266,748 on Feb. 23, 2016; and U.S. patent application Ser. No. 14/718,483, filed May 21, 2015.

A humidifier (e.g., a humidifier of an HDH desalination unit) in a system for producing a concentrated brine stream may have any configuration that allows for the transfer of water vapor from a liquid feed stream to a carrier gas stream (e.g., through an evaporation process). In certain embodiments, the humidifier comprises a vessel (e.g., a stainless steel tank or other vessel). The humidifier vessel can comprise a liquid inlet configured to receive a liquid feed stream comprising water and at least one dissolved salt and a gas inlet configured to receive a carrier gas stream. In some embodiments, the humidifier can further comprise a liquid outlet and a gas outlet.

A dehumidifier (e.g., a dehumidifier of an HDH desalination unit) in a system for producing a concentrated brine stream may have any configuration that allows for the transfer of water from a humidified gas stream to a stream comprising substantially pure water (e.g., through a condensation process). In certain embodiments, the dehumidifier comprises a vessel (e.g., a stainless steel tank or other vessel). The dehumidifier vessel can comprise a liquid inlet configured to receive a stream comprising substantially pure water and a gas inlet configured to receive the humidified gas stream. In some embodiments, the dehumidifier can further comprise a liquid outlet for the stream comprising substantially pure water and a gas outlet for the dehumidified gas stream.

According to some embodiments, the humidifier is a bubble column humidifier (e.g., a humidifier in which the evaporation process occurs through direct contact between a liquid feed stream and bubbles of a carrier gas) and/or the dehumidifier is a bubble column dehumidifier (e.g., a dehumidifier in which the condensation process occurs through direct contact between a substantially pure liquid stream and bubbles of a humidified gas). In some cases, bubble column humidifiers and bubble column dehumidifiers may be associated with certain advantages. For example, bubble column humidifiers and dehumidifiers may exhibit higher thermodynamic effectiveness than certain other types of humidifiers (e.g., packed bed humidifiers, spray towers, wetted wall towers) and dehumidifiers (e.g., surface condensers). Without wishing to be bound by a particular theory, the increased thermodynamic effectiveness may be at least partially attributed to the use of gas bubbles for heat and mass transfer in bubble column humidifiers and dehumidifiers, since gas bubbles may have more surface area available for heat and mass transfer than many other types of surfaces (e.g., metallic tubes, liquid films, packing material). In addition, bubble column humidifiers and dehumidifiers may have certain features that further increase thermodynamic effectiveness, including, but not limited to, relatively low liquid level height, relatively high aspect ratio liquid flow paths, and multi-staged designs.

In certain embodiments, a bubble column humidifier comprises at least one stage comprising a chamber and a liquid layer positioned within a portion of the chamber. The liquid layer may, in some cases, comprise a liquid comprising water and at least one dissolved salt. The chamber may further comprise a gas distribution region occupying at least a portion of the chamber not occupied by the liquid layer. In addition, the chamber may be in fluid communication with a bubble generator (e.g., a sparger plate). In some embodiments, a carrier gas stream flows through the bubble generator, forming bubbles of the carrier gas. The carrier gas bubbles may then travel through the liquid layer. The liquid layer may be maintained at a temperature higher than the temperature of the gas bubbles, and as the gas bubbles directly contact the liquid layer, heat and/or mass may be transferred from the liquid layer to the gas bubbles. In some cases, at least a portion of water may be transferred to the gas bubbles through an evaporation process. The bubbles of the humidified gas may exit the liquid layer and enter the gas distribution region. The humidified gas may be substantially homogeneously distributed throughout the gas distribution region. The humidified gas may then exit the bubble column humidifier as a humidified gas stream.

In some embodiments, a bubble column dehumidifier comprises at least one stage comprising a chamber and a liquid layer positioned within a portion of the chamber. The liquid layer may, in some cases, comprise substantially pure water. The chamber may further comprise a gas distribution region occupying at least a portion of the chamber not occupied by the liquid layer. In addition, the chamber may be in fluid communication with a bubble generator (e.g., a sparger plate). In some embodiments, the humidified gas stream flows from the humidifier through the bubble generator, forming bubbles of the humidified gas. The bubbles of the humidified gas may then travel through the liquid layer. The liquid layer may be maintained at a temperature lower than the temperature of the humidified gas bubbles, and as the humidified gas bubbles directly contact the liquid layer, heat and/or mass may be transferred from the humidified gas bubbles to the liquid layer via a condensation process.

Suitable bubble column condensers that may be used as the dehumidifier and/or suitable bubble column humidifiers that may be used as the humidifier in certain systems and methods described herein include those described in U.S. Pat. No. 9,266,748 by Govindan et al., issued Feb. 23, 2016, and entitled "Transiently-Operated Desalination Systems with Heat Recovery and Associated Methods"; U.S. Pat. No. 9,079,117 by Govindan et al., issued Jul. 14, 2015, and entitled "Systems Including a Condensing Apparatus Such as a Bubble Column Condenser"; U.S. Pat. No. 9,120,033 by Govindan et al., issued Sep. 1, 2015, and entitled "Multi-Stage Bubble Column Humidifier"; U.S. Pat. No. 9,072,984 by Govindan et al., issued Jul. 7, 2015, and entitled "Bubble-Column Vapor Mixture Condenser"; U.S. Pat. No. 8,523,985, by Govindan et al., issued Sep. 3, 2013, and entitled "Bubble-Column Vapor Mixture Condenser"; U.S. Pat. No. 8,778,065, by Govindan et al., issued Jul. 15, 2014, and entitled "Humidification-Dehumidification System Including a Bubble-Column Vapor Mixture Condenser"; U.S. Patent Publication No. 2015/0083577, filed on Sep. 23, 2014, and entitled "Desalination Systems and Associated Methods"; U.S. Patent Publication No. 2015/0129410, filed on Sep. 12, 2014, and entitled "Systems Including a Condensing Apparatus Such as a Bubble Column Condenser"; and U.S. patent application Ser. No. 14/718,483, filed on May 21, 2015, and entitled "Systems Including an Apparatus Comprising Both a Humidification Region and a Dehumidification Region," each of which is incorporated herein by reference in its entirety for all purposes.

In some embodiments, the humidifier and/or dehumidifier comprise a plurality of stages. For example, the stages may be arranged such that a gas (e.g., a carrier gas, a humidified gas) flows sequentially from a first stage to a second stage. In some cases, the stages may be arranged in a vertical fashion (e.g., a second stage positioned above a first stage) or a horizontal fashion (e.g., a second stage positioned to the right or left of a first stage). In some cases, each stage may comprise a liquid layer. In embodiments relating to a humidifier comprising a plurality of stages (e.g., a multi-stage humidifier), the temperature of the liquid layer of the first stage (e.g., the bottommost stage in a vertically arranged bubble column) may be lower than the temperature of the liquid layer of the second stage, which may be lower than the temperature of the liquid layer of the third stage (e.g., the topmost stage in a vertically arranged bubble column). In embodiments relating to a dehumidifier comprising a plurality of stages (e.g., a multi-stage dehumidifier), the temperature of the liquid layer of the first stage may be higher than the temperature of the liquid layer of the second stage, which may be higher than the temperature of the liquid layer of the third stage.

The presence of multiple stages within a bubble column humidifier and/or bubble column dehumidifier may, in some cases, advantageously result in increased humidification and/or dehumidification of a gas. In some cases, the presence of multiple stages may advantageously lead to higher recovery of substantially pure water. For example, the presence of multiple stages may provide numerous locations where the gas may be humidified and/or dehumidified (e.g., treated to recover substantially pure water). That is, the gas may travel through more than one liquid layer in which at least a portion of the gas undergoes humidification (e.g., evaporation) or dehumidification (e.g., condensation). In addition, the presence of multiple stages may increase the difference in temperature between a liquid stream at an inlet and an outlet of a humidifier and/or dehumidifier. This may be advantageous in systems where heat from a liquid stream (e.g., dehumidifier liquid outlet stream) is transferred to a separate stream (e.g., humidifier input stream) within the system. In such cases, the ability to produce a heated dehumidifier liquid outlet stream can increase the energy effectiveness of the system. Additionally, the presence of multiple stages may enable greater flexibility for fluid flow within an apparatus. For example, extraction and/or injection of fluids (e.g., gas streams) from intermediate humidification and/or dehumidification stages may occur through intermediate exchange conduits.

In some cases, a bubble column humidifier and/or a bubble column dehumidifier is configured to extract partially humidified gas from at least one intermediate location in the humidifier (e.g., not the final humidification stage) and to inject the partially humidified gas into at least one intermediate location in the dehumidifier (e.g., not the first dehumidification stage). In some embodiments, extraction from at least one intermediate location in the humidifier and injection into at least one intermediate location in the dehumidifier may be thermodynamically advantageous. Because the portion of the gas flow exiting the humidifier at an intermediate outlet (e.g., the extracted portion) has not passed through the entire humidifier, the temperature of the gas flow at the intermediate outlet may be lower than the temperature of the gas flow at the main gas outlet of the humidifier. The location of the extraction points (e.g., outlets) and/or injection points (e.g., inlets) may be selected to increase the thermal efficiency of the system. For example, because a gas (e.g., air) may have increased vapor content at higher temperatures than at lower temperatures, and because the heat capacity of a gas with higher vapor content may be higher than the heat capacity of a gas with lower vapor content, less gas may be used in higher temperature areas of the humidifier and/or dehumidifier to better balance the heat capacity rate ratios of the gas (e.g., air) and liquid (e.g., water) streams. Extraction and/or injection at intermediate locations may therefore advantageously allow for manipulation of gas mass flows and for greater heat recovery.

The humidifier and/or dehumidifier may be of any size. In some cases, the size of the humidifier and/or dehumidifier will generally depend upon the number of humidifiers and/or dehumidifiers employed in the system and the total flow rate of the liquid that is to be desalinated. In certain embodiments, the total of the volumes of the humidifiers and/or dehumidifiers used in the system for producing a concentrated brine stream can be at least about 1 gallon, at least about 10 gallons, at least about 100 gallons, at least about 500 gallons, at least about 1,000 gallons, at least about 2,000 gallons, at least about 5,000 gallons, at least about 7,000 gallons, at least about 10,000 gallons, at least about 20,000 gallons, at least about 50,000 gallons, or at least about 100,000 gallons (and/or, in some embodiments, up to about 1,000,000 gallons, or more).

It should be recognized that the inventive systems and methods described herein are not limited to those including a bubble column humidifier and/or a bubble column dehumidifier and that other types of humidifiers and/or dehumidifiers may be used in some embodiments. For example, in some embodiments, the humidifier is a packed bed humidifier. In certain cases, the humidifier comprises a packing material (e.g., polyvinyl chloride (PVC) packing material). The packing material may, in some cases, facilitate turbulent gas flow and/or enhanced direct contact between the liquid stream comprising water and at least one dissolved salt and the carrier gas stream within the humidifier. In certain embodiments, the humidifier further comprises a device configured to produce droplets of the liquid feed stream. For example, a nozzle or other spraying device may be positioned at the top of the humidifier such that the liquid feed stream is sprayed downward to the bottom of the humidifier. The use of a spraying device can advantageously increase the degree of contact between the liquid feed stream fed to the humidifier and the carrier gas stream into which water from the liquid feed stream is transported.

In some embodiments, an HDH desalination unit further comprises one or more additional devices. According to some embodiments, for example, an HDH desalination unit further comprises a heat exchanger in fluid communication with the humidifier and/or dehumidifier. In certain cases, the heat exchanger advantageously facilitates transfer of heat from a liquid stream exiting the dehumidifier to a liquid stream entering the humidifier. For example, the heat exchanger may advantageously allow energy to be recovered from a dehumidifier liquid outlet stream and used to pre-heat a humidifier liquid inlet stream prior to entry of the humidifier liquid inlet stream into the humidifier.

In certain embodiments, an HDH desalination unit further comprises an optional heating device arranged in fluid communication with the humidifier. The optional heating device may be any device capable of transferring heat to a liquid stream. The heating device may be a heat exchanger, a heat collection device (e.g., a device configured to store and/or utilize thermal energy), or an electric heater. In certain cases, the heating device may be arranged such that a liquid feed stream is heated prior to entering the humidifier. Heating the liquid feed stream may, in some cases, increase the degree to which water is transferred from the liquid feed stream to the carrier gas stream within the humidifier.

In some embodiments, an HDH desalination unit further comprises an optional cooling device arranged in fluid communication with the dehumidifier. In certain cases, a stream comprising substantially pure water may be cooled by the cooling device prior to entering the dehumidifier. A cooling device generally refers to any device that is capable of removing heat from a fluid stream (e.g., a liquid stream, a gas stream). The cooling device may be a heat exchanger (e.g., an air-cooled heat exchanger), a dry cooler, a chiller, a radiator, or any other device capable of removing heat from a fluid stream.

It should be understood that the inventive systems and methods described herein are not limited to those including a humidification-dehumidification desalination unit and that in other embodiments, other types of desalination units may be employed. Non-limiting examples of suitable desalination units include a mechanical vapor compression unit, a multi-effect distillation unit, a multi-stage flash unit, and a vacuum distillation unit. In some embodiments, a desalination system comprises a plurality of desalination units, each of which may be any type of desalination unit. The desalination units of a desalination system may be the same or different types of desalination units.

In some embodiments, certain systems and methods described herein (e.g., hybrid systems for producing a concentrated brine stream) may have a relatively high liquid feed rate (e.g., amount of liquid feed entering the system per unit time). In certain embodiments, the system for producing a concentrated brine stream has a liquid feed rate of at least about 5 barrels/day, at least about 10 barrels/day, at least about 20 barrels/day, at least about 50 barrels/day, at least about 100 barrels/day, at least about 200 barrels/day, at least about 300 barrels/day, at least about 400 barrels/day, at least about 500 barrels/day, at least about 600 barrels/day, at least about 700 barrels/day, at least about 800 barrels/day, at least about 900 barrels/day, at least about 1,000 barrels a day, at least about 2,000 barrels/day, at least about 5,000 barrels/day, at least about 10,000 barrels/day, at least about 20,000 barrels/day, at least about 30,000 barrels/day, at least about 35,000 barrels/day, at least about 40,000 barrels/day, at least about 50,000 barrels/day (and/or, in some embodiments, up to about 100,000 barrels/day, or more). In some embodiments, the hybrid system for producing a concentrated brine stream has a relatively high rate of production of substantially pure water (e.g., amount of substantially pure water produced per unit time). In certain cases, the system has a substantially pure water production rate of at least about 10 barrels/day, at least about 50 barrels/day, at least about 100 barrels/day, at least about 200 barrels/day, at least about 300 barrels/day, at least about 400 barrels/day, at least about 500 barrels/day, at least about 600 barrels/day, at least about 700 barrels/day, at least about 800 barrels/day, at least about 900 barrels/day, at least about 1,000 barrels a day, at least about 2,000 barrels/day, at least about 5,000 barrels/day, or at least about 10,000 barrels/day (and/or, in some embodiments, up to about 100,000 barrels/day, or more).

Certain of the systems described herein can be configured to desalinate saline solutions entering at relatively high flow rates, and accordingly, can be configured to produce relative pure water streams at relatively high flow rates. For example, in some embodiments, the systems and methods described herein may be configured and sized to operate to receive a liquid feed stream at a flow rate of at least about 1 gallon/minute, at least about 10 gallons/minute, at least about 100 gallons/minute, or at least about 1000 gallons/minute (and/or, in certain embodiments, up to about 10,000 gallons/minute, or more).

In some embodiments, at least a portion of the hybrid system for producing a concentrated brine stream (e.g., the dehumidifier of an HDH desalination unit) is configured to produce a stream comprising water of relatively high purity. For example, in some embodiments, the system produces one or more streams comprising water in an amount of at least about 95 wt %, at least about 99 wt %, at least about 99.9 wt %, or at least about 99.99 wt % (and/or, in certain embodiments, up to about 99.999 wt %, or more). In some embodiments, the percentage volume of a liquid feed stream that is recovered as fresh water is at least about 40%, at least about 45%, at least about 50%, at least about 55%, at least about 58%, at least about 60%, or at least about 70%.

In some embodiments, the one or more substantially pure water streams have a relatively low concentration of one or more dissolved salts. In some cases, the concentration of at least one dissolved salt (e.g., NaCl) in the one or more substantially pure water streams is about 500 mg/L or less, about 200 mg/L or less, about 100 mg/L or less, about 50 mg/L or less, about 20 mg/L or less, about 10 mg/L or less, about 5 mg/L or less, about 2 mg/L or less, about 1 mg/L or less, about 0.5 mg/L or less, about 0.2 mg/L or less, about 0.1 mg/L or less, about 0.05 mg/L or less, about 0.02 mg/L or less, or about 0.01 mg/L or less. According to some embodiments, the concentration of at least one dissolved salt in the one or more substantially pure water streams is substantially zero (e.g., not detectable). In certain cases, the concentration of at least one dissolved salt in the one or more substantially pure water streams is in the range of about 0 mg/L to about 500 mg/L, about 0 mg/L to about 200 mg/L, about 0 mg/L to about 100 mg/L, about 0 mg/L to about 50 mg/L, about 0 mg/L to about 20 mg/L, about 0 mg/L to about 10 mg/L, about 0 mg/L to about 5 mg/L, about 0 mg/L to about 2 mg/L, about 0 mg/L to about 1 mg/L, about 0 mg/L to about 0.5 mg/L, about 0 mg/L to about 0.1 mg/L, about 0 mg/L to about 0.05 mg/L, about 0 mg/L to about 0.02 mg/L, or about 0 mg/L to about 0.01 mg/L.

In some embodiments, the one or more substantially pure water streams contain at least one dissolved salt in an amount of about 2 wt % or less, about 1 wt % or less, about 0.5 wt % or less, about 0.2 wt % or less, about 0.1 wt % or less, about 0.05 wt % or less, or about 0.01 wt % or less. In some embodiments, the one or more substantially pure water streams contain at least one dissolved salt in an amount in the range of about 0.01 wt % to about 2 wt %, about 0.01 wt % to about 1 wt %, about 0.01 wt % to about 0.5 wt %, about 0.01 wt % to about 0.2 wt %, or about 0.01 wt % to about 0.1 wt %. In some embodiments, the concentration of at least one dissolved salt in the one or more substantially pure water streams is substantially less than the concentration of the at least one dissolved salt in the liquid feed stream received by the desalination system. In some cases, the concentration of at least one dissolved salt in the one or more substantially pure water streams is at least about 0.5%, about 1%, about 2%, about 5%, about 10%, about 15%, or about 20% less than the concentration of the at least one dissolved salt in the liquid feed stream.

In some embodiments, the one or more substantially pure water streams have a relatively low total dissolved salt concentration. In some cases, the total dissolved salt concentration in the one or more substantially pure water streams is about 500 mg/L or less, about 200 mg/L or less, about 100 mg/L or less, about 50 mg/L or less, about 20 mg/L or less, about 10 mg/L or less, about 5 mg/L or less, about 2 mg/L or less, about 1 mg/L or less, about 0.5 mg/L or less, about 0.2 mg/L or less, about 0.1 mg/L or less, about 0.05 mg/L or less, about 0.02 mg/L or less, or about 0.01 mg/L or less. According to some embodiments, the total dissolved salt concentration in the one or more substantially pure water streams is substantially zero (e.g., not detectable). In certain embodiments, the total dissolved salt concentration in the one or more substantially pure water streams is in the range of about 0 mg/L to about 500 mg/L, about 0 mg/L to about 200 mg/L, about 0 mg/L to about 100 mg/L, about 0 mg/L to about 50 mg/L, about 0 mg/L to about 20 mg/L, about 0 mg/L to about 10 mg/L, about 0 mg/L to about 5 mg/L, about 0 mg/L to about 2 mg/L, about 0 mg/L to about 1 mg/L, about 0 mg/L to about 0.5 mg/L, about 0 mg/L to about 0.1 mg/L, about 0 mg/L to about 0.2 mg/L, about 0 mg/L to about 0.1 mg/L, about 0 mg/L to about 0.05 mg/L, about 0 mg/L to about 0.02 mg/L, or about 0 mg/L to about 0.01 mg/L. In some embodiments, the total dissolved salt concentration of the one or more substantially pure water streams is substantially less than the total dissolved salt concentration of a liquid feed stream received by the system for producing a concentrated brine stream. In some cases, the total dissolved salt concentration of the one or more substantially pure water streams is at least about 0.5%, about 1%, about 2%, about 5%, about 10%, about 15%, or about 20% less than the total dissolved salt concentration of the liquid feed stream.

According to some embodiments, the one or more substantially pure water streams have a relatively low salinity (e.g., weight percent of all dissolved salts). In some embodiments, the one or more substantially pure water streams have a salinity of about 5% or less, about 2% or less, about 1% or less, about 0.5% or less, about 0.2% or less, about 0.1% or less, about 0.05% or less, or about 0.01% or less. In some embodiments, the one or more substantially pure water streams have a salinity in the range of about 0.01% to about 5%, about 0.01% to about 2%, about 0.01% to about 1%, about 0.01% to about 0.5%, about 0.01% to about 0.2%, or about 0.01% to about 0.1%. According to some embodiments, at least a portion of the hybrid system (e.g., the humidifier of an HDH desalination unit) is configured to produce a concentrated brine stream (e.g., a stream comprising a relatively high concentration of at least one dissolved salt). The concentrated brine stream may be recirculated through a fluidic circuit comprising at least a portion of one or more desalination units (e.g., one or more second desalination units) until a certain condition (e.g., a target density and/or salinity) is met.

In some embodiments, the recirculated concentrated brine stream may be discharged upon satisfaction of the condition. The discharged concentrated brine stream may, in some cases, have a relatively high salinity (e.g., wt % of all dissolved salts). In some cases, the salinity of the discharged concentrated brine stream is at least about 10%, at least about 15%, at least about 20%, at least about 25%, at least about 26%, at least about 27%, at least about 28%, at least about 29%, or at least about 30%. In some embodiments, the salinity of the discharged concentrated brine stream is in the range of about 10% to about 20%, about 10% to about 25%, about 10% to about 26%, about 10% to about 27%, about 10% to about 28%, about 10% to about 29%, about 10% to about 30%, about 15% to about 20%, about 15% to about 25%, about 15% to about 26%, about 15% to about 27%, about 15% to about 28%, about 15% to about 29%, about 15% to about 30%, about 20% to about 25%, about 20% to about 26%, about 20% to about 27%, about 20% to about 28%, about 20% to about 29%, about 20% to about 30%, about 25 wt % to about 26 wt %, about 25 wt % to about 27 wt %, about 25 wt % to about 28 wt %, about 25 wt % to about 29 wt %, or about 25% to about 30%.

The discharged concentrated brine stream may, in some cases, have a relatively high concentration of at least one dissolved salt (e.g., NaCl). In certain cases, the concentration of at least one dissolved salt in the discharged concentrated brine stream is at least about 100 mg/L, at least about 200 mg/L, at least about 500 mg/L, at least about 1,000 mg/L, at least about 2,000 mg/L, at least about 5,000 mg/L, at least about 10,000 mg/L, at least about 20,000 mg/L, at least about 50,000 mg/L, at least about 75,000 mg/L, at least about 100,000 mg/L, at least about 150,000 mg/L, at least about 200,000 mg/L, at least about 250,000 mg/L, at least about 300,000 mg/L, at least about 350,000 mg/L, at least about 400,000 mg/L, at least about 450,000 mg/L, or at least about 500,000 mg/L (and/or, in certain embodiments, up to the solubility limit of the salt in the concentrated brine stream). In some embodiments, the concentration of at least one dissolved salt in the discharged concentrated brine stream is in the range of about 1,000 mg/L to about 10,000 mg/L, about 1,000 mg/L to about 20,000 mg/L, about 1,000 mg/L to about 50,000 mg/L, about 1,000 mg/L to about 100,000 mg/L, about 1,000 mg/L to about 150,000 mg/L, about 1,000 mg/L to about 200,000 mg/L, about 1,000 mg/L to about 250,000 mg/L, about 1,000 mg/L to about 300,000 mg/L, about 1,000 mg/L to about 350,000 mg/L, about 1,000 mg/L to about 400,000 mg/L, about 1,000 mg/L to about 450,000 mg/L, about 1,000 mg/L to about 500,000 mg/L, about 10,000 mg/L to about 20,000 mg/L, about 10,000 mg/L to about 50,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 400,000 mg/L, about 10,000 mg/L to about 450,000 mg/L, about 10,000 mg/L to about 500,000 mg/L, about 20,000 mg/L to about 50,000 mg/L, about 20,000 mg/L to about 100,000 mg/L, about 20,000 mg/L to about 150,000 mg/L, about 20,000 mg/L to about 200,000 mg/L, about 20,000 mg/L to about 250,000 mg/L, about 20,000 mg/L to about 300,000 mg/L, about 20,000 mg/L to about 350,000 mg/L, about 20,000 mg/L to about 400,000 mg/L, about 20,000 mg/L to about 450,000 mg/L, about 20,000 mg/L to about 500,000 mg/L, about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 400,000 mg/L, about 50,000 mg/L to about 450,000 mg/L, about 50,000 mg/L to about 500,000 mg/L, about 100,000 mg/L to about 150,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 400,000 mg/L, about 100,000 mg/L to about 450,000 mg/L, or about 100,000 mg/L to about 500,000 mg/L.

In some embodiments, the discharged concentrated brine stream contains at least one dissolved salt (e.g., NaCl) in an amount of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, or at least about 30 wt % (and/or, in certain embodiments, up to the solubility limit of the salt in the concentrated brine stream). In some embodiments, the discharged concentrated brine stream comprises at least one dissolved salt in an amount in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 25 wt % to about 26 wt %, about 25 wt % to about 27 wt %, about 25 wt % to about 28 wt %, about 25 wt % to about 29 wt %, or about 25 wt % to about 30 wt %.

In some embodiments, the concentration of at least one dissolved salt in the concentrated brine stream is substantially greater than the concentration of the at least one dissolved salt in the liquid feed stream received by the hybrid system for producing a concentrated brine stream. In some cases, the concentration of at least one dissolved salt in the concentrated brine stream is at least about 0.5%, about 1%, about 2%, about 5%, about 10%, about 15%, or about 20% greater than the concentration of the at least one dissolved salt in the liquid feed stream.

In some embodiments, the total dissolved salt concentration of the concentrated brine stream upon discharge may be relatively high. In certain cases, the total dissolved salt concentration of the discharged concentrated brine stream is at least about 1,000 mg/L, at least about 2,000 mg/L, at least about 5,000 mg/L, at least about 10,000 mg/L, at least about 20,000 mg/L, at least about 50,000 mg/L, at least about 75,000 mg/L, at least about 100,000 mg/L, at least about 150,000 mg/L, at least about 200,000 mg/L, at least about 250,000 mg/L, at least about 300,000 mg/L, at least about 350,000 mg/L, at least about 400,000 mg/L, at least about 450,000 mg/L, at least about 500,000 mg/L, at least about 550,000 mg/L, or at least about 600,000 mg/L (and/or, in certain embodiments, up to the solubility limit of the salt(s) in the concentrated brine stream). In some embodiments, the total salt concentration of the discharged concentrated brine stream is in the range of about 10,000 mg/L to about 20,000 mg/L, about 10,000 mg/L to about 50,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 400,000 mg/L, about 10,000 mg/L to about 450,000 mg/L, about 10,000 mg/L to about 500,000 mg/L, about 10,000 mg/L to about 550,000 mg/L, about 10,000 mg/L to about 600,000 mg/L, about 20,000 mg/L to about 50,000 mg/L, about 20,000 mg/L to about 100,000 mg/L, about 20,000 mg/L to about 150,000 mg/L, about 20,000 mg/L to about 200,000 mg/L, about 20,000 mg/L to about 250,000 mg/L, about 20,000 mg/L to about 300,000 mg/L, about 20,000 mg/L to about 350,000 mg/L, about 20,000 mg/L to about 400,000 mg/L, about 20,000 mg/L to about 450,000 mg/L, about 20,000 mg/L to about 500,000 mg/L, about 20,000 mg/L to about 550,000 mg/L, about 20,000 mg/L to about 600,000 mg/L, about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 400,000 mg/L, about 50,000 mg/L to about 450,000 mg/L, about 50,000 mg/L to about 500,000 mg/L, about 50,000 mg/L to about 550,000 mg/L, about 50,000 mg/L to about 600,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 400,000 mg/L, about 100,000 mg/L to about 450,000 mg/L, about 100,000 mg/L to about 500,000 mg/L, about 100,000 mg/L to about 550,000 mg/L, or about 100,000 mg/L to about 600,000 mg/L.

In some embodiments, the total dissolved salt concentration of the discharged concentrated brine stream is significantly higher than the total dissolved salt concentration of a liquid feed stream received by the system for producing a concentrated brine stream. In some cases, the total dissolved salt concentration of the discharged concentrated brine stream is at least about 5%, at least about 6%, at least about 10%, at least about 14%, at least about 15%, at least about 20%, or at least about 25% greater than the total dissolved salt concentration of the liquid feed stream.

In some cases, the concentration of at least one salt in the concentrated brine stream is at or near the saturation limit. The saturation limit of an aqueous saline solution, as used herein, refers to the concentration of a salt at which 0.5 wt % of the aqueous solution is made up of the salt. The above-defined saturation limit is typically at or near the bulk salt concentration at which there is inception of crystal formation. One can determine whether a given solution is at its saturation limit with respect to the salt(s) contained within the aqueous solution by inspecting the solution to determine whether the formation of solid salt is occurring. In some cases, a concentrated brine comprising at least one salt at or near the saturation limit may be referred to as a "saturated brine."

Generally, the saturation limit of an aqueous saline solution will depend upon the temperature, pressure, and flow velocity of the saline solution. For example, saline aqueous solutions at relatively high temperatures will generally have higher solubility limits than saline aqueous solutions at relatively low temperatures. As another example, saline aqueous solutions at relatively high flow velocities will generally have higher solubility limits than saline aqueous solutions at relatively low flow velocities.

According to some embodiments, the discharged concentrated brine stream has a relatively high density. It may be advantageous, in some cases, for a concentrated brine stream to have a relatively high density, as a higher density may result in increased effectiveness in certain applications (e.g., use as a kill fluid for oil or gas wells). In some cases, the density of the discharged concentrated brine stream is measured at a temperature of about 120° F. or less, about 100° F. or less, about 80° F. or less, about 72° F. or less, about 68° F. or less, about 60° F. or less, about 50° F. or less, or about 40° F. or less. In some embodiments, the density of the discharged concentrated brine stream is measured at a temperature of at least about 40° F., at least about 50° F., at least about 60° F., at least about 68° F., at least about 72° F., at least about 80° F., at least about 100° F., or at least about 120° F. In some embodiments, the density of the discharged concentrated brine stream is measured at a temperature in the range of about 40° F. to about 120° F., about 40° F. to about 100° F., about 40° F. to about 80° F., about 40° F. to about 72° F., about 40° F. to about 68° F., about 40° F. to about 60° F., about 40° F. to about 50° F., about 60° F. to about 120° F., about 60° F. to about 100° F., or about 60° F. to about 80° F. In certain embodiments, the discharged concentrated brine stream has a density (e.g., measured at about 60° F.) of at least about 9.5 pounds/gallon, at least about 10 pounds/gallon, at least about 10.5 pounds/gallon, at least about 11 pounds/gallon, at least about 11.5 pounds/gallon, at least about 12 pounds/gallon, at least about 13 pounds/gallon, at least about 14 pounds/gallon, or at least about 15 pounds/gallon. In some embodiments, the discharged concentrated brine stream (e.g., measured at about 60° F.) has a density in the range of about 9.5 pounds/gallon to about 10 pounds/gallon, about 9.5 pounds/gallon to about 10.5 pounds/gallon, about 9.5 pounds/gallon to about 11 pounds/gallon, about 9.5 pounds/gallon to about 11.5 pounds/gallon, about 9.5 pounds/gallon to about 12 pounds/gallon, about 9.5 pounds/gallon to about 13 pounds/gallon, about 9.5 pounds/gallon to about 14 pounds/gallon, about 9.5 pounds/gallon to about 15 pounds/gallon, about 10 pounds/gallon to about 11 pounds/gallon, about 10 pounds/ gallon to about 11.5 pounds/gallon, about 10 pounds/gallon to about 12 pounds/gallon, about 10 pounds/gallon to about 13 pounds/gallon, about 10 pounds/gallon to about 14 pounds/gallon, about 10 pounds/gallon to about 15 pounds/ gallon, about 11 pounds/gallon to about 11.5 pounds/gallon, about 11 pounds/gallon to about 12 pounds/gallon, about 11 pounds/gallon to about 13 pounds/gallon, about 11 pounds/ gallon to about 14 pounds/gallon, about 11 pounds/gallon to about 15 pounds/gallon, about 11.5 pounds/gallon to about 12 pounds/gallon, about 11.5 pounds/gallon to about 13 pounds/gallon, about 11.5 pounds/gallon to about 14 pounds/gallon, about 11.5 pounds/gallon to about 15 pounds/gallon, about 12 pounds/gallon to about 13 pounds/ gallon, about 12 pounds/gallon to about 14 pounds/gallon, about 12 pounds/gallon to about 15 pounds/gallon, about 13 pounds/gallon to about 15 pounds/gallon, or about 14 pounds/gallon to about 15 pounds/gallon.

In some embodiments, a hybrid system for producing a concentrated brine stream comprises one or more vessels (e.g., collection vessels). For example, a system may comprise one or more feed tanks and/or one or more concentrated brine storage tanks. The vessels (e.g., collection vessels) may be any type of vessel known in the art and may comprise any vessel configured to contain a quantity of a liquid. For example, non-limiting examples of suitable vessels include tanks, containers, collection ponds, and reservoirs. The vessels may also have any size. In some cases, the vessels may be relatively large. According to certain embodiments, one or more vessels in a hybrid system for producing a concentrated brine stream have a volume of at least about 1,000 gallons, at least about 2,000 gallons, at least about 5,000 gallons, at least about 7,000 gallons, at least about 10,000 gallons, at least about 20,000 gallons, or at least about 50,000 gallons.

In some embodiments, a hybrid system for producing a concentrated brine stream is configured to recover heat from concentrated brine streams that are discharged from the system. During the transient operation of a desalination unit, a concentrated brine stream recirculating through the unit may be heated to a relatively high temperature. It may be advantageous to recover at least a portion of the heat of the recirculated concentrated brine stream prior to discharging the recirculated concentrated brine stream from the unit instead of wasting the thermal energy. Accordingly, in some embodiments, the system comprises at least one heat exchanger. Prior to being discharged from the system, a recirculated concentrated brine stream may flow through a first portion of the heat exchanger. While the recirculated concentrated brine stream is flowing through a first portion of the heat exchanger, an incoming liquid feed stream may flow through a second portion of the heat exchanger, and heat may be transferred from the recirculated concentrated brine stream to the liquid feed stream. In some cases, it may be desirable for the liquid feed stream to be at a relatively high temperature in order to promote evaporation of water vapor from the liquid feed stream to a carrier gas stream in the humidifier. Recovery of heat from the recirculated concentrated brine stream may avoid the need to use an external heating device to heat the liquid feed stream or may reduce the amount of external input energy needed to heat the liquid feed stream prior to flowing through the humidifier. In addition, large temperature differences between the concentrated brine stream flowing through a recirculation loop and the incoming liquid feed stream may disrupt the thermal steady state of the system. A system including one or more heat exchangers operated to promote energy recovery may advantageously reduce the temperature difference between the recirculated concentrated brine stream and the incoming liquid feed stream. Such exemplary schematic diagrams of systems for producing a concentrated brine stream that are configured to recover heat from concentrated brine streams discharged from the system are shown and described in commonly-owned U.S. patent application Ser. No. 14/719,189, filed May 21, 2015, and issued as U.S. Pat. No. 9,266,748 on Feb. 23, 2016.

According to some embodiments, a hybrid system for producing a concentrated brine stream, particularly those configured to recover heat from concentrated brine streams, comprises a heat exchanger. Any heat exchanger known in the art may be used. Examples of suitable heat exchangers include, but are not limited to, plate-and-frame heat exchangers, shell-and-tube heat exchangers, tube-and-tube heat exchangers, plate heat exchangers, plate-and-shell heat exchangers, spiral heat exchangers, and the like. In a particular embodiment, the heat exchanger is a plate-and-frame heat exchanger. In certain embodiments, the heat exchanger may be configured such that a first fluid stream and a second fluid stream flow through the heat exchanger. In some cases, the first fluid stream and the second fluid stream may flow in substantially the same direction (e.g., parallel flow), substantially opposite directions (e.g., counter flow), or substantially perpendicular directions (e.g., cross flow). In some cases, more than two fluid streams may flow through the heat exchanger. In an exemplary embodiment, the heat exchanger is a counter-flow plate-and-frame heat exchanger. In some cases, a counter-flow plate-and-frame heat exchanger may advantageously result in a small temperature difference between two fluid streams flowing through the heat exchanger.

In some embodiments, a relatively large amount of heat may be transferred between the concentrated brine stream and an incoming or recycled liquid stream. For example, the difference between the temperature of a fluid entering the heat exchanger and the fluid exiting the heat exchanger may be at least about 5° C., at least about 10° C., at least about 15° C., at least about 20° C., at least about 30° C., at least about 40° C., at least about 50° C., at least about 60° C., at least about 70° C., at least about 80° C., at least about 90° C., or at least about 100° C. In some embodiments, the difference between the temperature of a fluid entering the heat exchanger and the fluid exiting the heat exchanger may be in the range of about 5° C. to about 20° C., about 5° C. to about 30° C., about 5° C. to about 50° C., about 5° C. to about 60° C., about 5° C. to about 90° C., about 5° C. to about 100° C., about 10° C. to about 30° C., about 10° C. to about 60° C., about 10° C. to about 90° C., about 10° C. to about 100° C., about 20° C. to about 60° C., about 20° C. to about 90° C., about 20° C. to about 100° C., about 30° C. to about 60° C., about 30° C. to about 90° C., about 30° C. to about 100° C., about 50° C. to about 100° C., about 60° C. to about 90° C., about 60° C. to about 100° C., or about 80° C. to about 100° C.

In some embodiments, a hybrid system for producing a concentrated brine stream may be configured to not only directly recover heat from a concentrated brine stream being discharged from the system, but also to recover residual heat remaining in a vessel used to store the concentrated brine stream. In some cases, while a first portion of a concentrated brine stream is recirculating through a desalination system, a second portion of the concentrated brine stream may be circulated from a concentrated brine storage tank to a heat exchanger. A portion of a liquid feed stream comprising water and at least one dissolved salt may also be circulated from a feed tank to the heat exchanger. An amount of heat may be transferred from the concentrated brine stream to the liquid feed stream in the heat exchanger. Recovery of heat from a concentrated brine storage tank during periods between concentrated brine discharges may be referred to as secondary heat recovery, while direct recovery of heat from a discharged concentrated brine stream flowing through a heat exchanger may be referred to as primary heat recovery. Exemplary schematic diagrams of such systems for producing a concentrated brine stream that are configured for secondary heat recovery are shown and described in commonly-owned U.S. patent application Ser. No. 14/719,189, filed May 21, 2015, and issued as U.S. Pat. No. 9,266,748 on Feb. 23, 2016.

Some aspects are related to a method of forming an ultra-high-density concentrated brine stream (e.g., a concentrated brine stream having a density of at least about 11.7 pounds/gallon). In some embodiments, a method of forming an ultra-high-density concentrated brine stream comprises the step of adding an amount of one or more salts to a liquid stream to produce an ultra-high-density concentrated brine stream. For example, in certain embodiments, a concentrated brine stream comprising at least one dissolved salt is produced by a transiently-operated portion of a hybrid desalination system according to systems and methods described herein, and an amount of one or more additional salts is added to the concentrated brine stream to produce an ultra-high-density concentrated brine stream. In some cases, an amount of one or more salts may be added to other types of liquid streams, such as a concentrated brine stream produced by a continuously-operated desalination unit, a liquid feed stream (e.g., produced water, flowback water), a stream of substantially pure water, or any other type of liquid stream. Non-limiting examples of suitable salts to add to a concentrated brine stream (e.g., a concentrated brine stream produced by a transiently-operated desalination system), a liquid feed stream, a substantially pure water stream, and/or another liquid stream to produce an ultra-high-density concentrated brine stream include sodium chloride (NaCl), calcium chloride ($CaCl_2$), magnesium chloride ($MgCl_2$), copper (II) chloride ($CuCl_2$), iron (III) chloride hexahydrate ($FeCl_3.6H_2O$), iron (III) chloride ($FeCl_3$), lithium chloride (LiCl), manganese (II) chloride ($MnCl_2$), nickel (II) chloride ($NiCl_2$), zinc chloride ($ZnCl_2$), sodium bromide (NaBr), calcium bromide ($CaBr_2$), magnesium bromide ($MgBr_2$), potassium bromide (KBr), copper (II) bromide ($CuBr_2$), iron (III) bromide ($FeBr_3$), lithium bromide (LiBr), manganese (II) bromide ($MnBr_2$), nickel (II) bromide ($NiBr_2$), zinc bromide ($ZnBr_2$), ammonium nitrate ($NH_4NO_3$), sodium nitrate ($NaNO_3$), lithium nitrate ($LiNO_3$), calcium nitrate ($Ca(NO_3)_2$), magnesium nitrate ($Mg(NO_3)_2$), strontium nitrate ($Sr(NO_3)_2$), calcium nitrate tetrahydrate ($Ca(NO_3)_2.4H_2O$), copper (II) nitrate ($Cu(NO_3)_2$), iron (II) nitrate ($Fe(NO_3)_2$), iron (III) nitrate ($Fe(NO_3)_3$), nickel (II) nitrate ($Ni(NO_3)_2$), and/or zinc nitrate ($Zn(NO_3)_2$). In some embodiments, at least one of the one or more additional salts added to a liquid stream comprising water and at least one dissolved salt is different from the at least one dissolved salt. In some embodiments, each of the one or more additional salts added to the liquid stream is different from the at least one dissolved salt. In certain cases, at least one of the one or more additional salts added to the liquid stream is the same as the at least one dissolved salt.

In certain cases, an ultra-high-density concentrated brine stream is formed from a substantially solid material. As described in further detail herein, a hybrid system for producing a concentrated brine stream may comprise one or more desalination units (e.g., one or more desalination units configured to be transiently operated) and, optionally, a pretreatment system and/or precipitation apparatus fluidly connected to the one or more desalination units. In certain embodiments, the pretreatment system and/or precipitation apparatus may be configured to produce a substantially solid material (e.g., a filter cake). In certain cases, the substantially solid material comprises calcium carbonate ($CaCO_3$). In some cases, a method of forming an ultra-high-density concentrated brine stream comprises the step of adding an amount of one or more acids to the substantially solid material. Non-limiting examples of suitable acids to add to the substantially solid material include hydrochloric acid (HCl) and/or nitric acid ($HNO_3$). According to certain embodiments, addition of hydrochloric acid to a substantially solid material comprising calcium carbonate can produce an ultra-high-density concentrated brine stream comprising dissolved calcium chloride ($CaCl_2$). In some cases, addition of hydrochloric acid to the substantially solid material can produce carbon dioxide ($CO_2$). In certain embodiments, the $CO_2$ may be collected and advantageously used to increase the alkalinity of a liquid feed stream prior to an ion removal step in a pretreatment process, reducing the amount of soda ash required. In some cases, the $CO_2$ may be used to decrease the pH of the feed stream prior to a pH adjustment step of the pretreatment process, reducing the amount of additional acid (e.g., HCl) required. In some embodiments, addition of nitric acid to a substantially solid material comprising calcium carbonate can produce an ultra-high-density concentrated brine stream comprising dissolved calcium nitrate ($Ca(NO_3)_2$).

In some embodiments, the ultra-high-density concentrated brine stream has a density (e.g., measured at about 60° F.) of at least about 11 pounds/gallon, at least about 11.5 pounds/gallon, at least about 11.7 pounds/gallon, at least about 12 pounds/gallon, at least about 12.5 pounds/gallon, at least about 13 pounds/gallon, at least about 13.2 pounds/gallon, at least about 13.5 pounds/gallon, at least about 14 pounds/gallon, at least about 14.5 pounds/gallon, at least about 15 pounds/gallon, at least about 20 pounds/gallon, or at least about 25 pounds/gallon. In certain cases, the ultra-high-density concentrated brine stream has a density (e.g., measured at about 60° F.) in the range of about 11 pounds/gallon to about 12 pounds/gallon, about 11 pounds/gallon to about 12.5 pounds/gallon, about 11 pounds/gallon to about 13 pounds/gallon, about 11 pounds/gallon to about 13.2 pounds/gallon, about 11 pounds/gallon to about 13.5 pounds/gallon, about 11 pounds/gallon to about 14 pounds/gallon, about 11 pounds/gallon to about 14.5 pounds/gallon, about 11 pounds/gallon to about 15 pounds/gallon, about 11 pounds/gallon to about 20 pounds/gallon, about 11 pounds/gallon to about 25 pounds/gallon, about 11.5 pounds/gallon to about 12 pounds/gallon, about 11.5 pounds/gallon to about 12.5 pounds/gallon, about 11.5 pounds/gallon to about 13 pounds/gallon, about 11.5 pounds/gallon to about 13.2 pounds/gallon, about 11.5 pounds/gallon to about 13.5 pounds/gallon, about 11.5 pounds/gallon to about 14 pounds/gallon, about 11.5 pounds/gallon to about 14.5 pounds/gallon, about 11.5 pounds/gallon to about 15 pounds/gallon, about 11.5 pounds/gallon to about 20 pounds/gallon, about 11.5 pounds/gallon to about 25 pounds/gallon, about 11.7 pounds/gallon to about 12.5 pounds/gallon, about 11.7 pounds/gallon to about 13 pounds/gallon, about 11.7 pounds/gallon to about 13.2 pounds/gallon, about 11.7 pounds/gallon to about 13.5 pounds/gallon, about 11.7 pounds/gallon to about 14 pounds/gallon, about 11.7 pounds/gallon to about 14.5 pounds/gallon, about 11.7 pounds/gallon to about 15 pounds/gallon, about 11.7 pounds/gallon to about 20 pounds/gallon, about 11.7 pounds/gallon to about 25 pounds/gallon, about 12 pounds/gallon to about 12.5 pounds/gallon, about 12 pounds/gallon to about 13 pounds/gallon, about 12 pounds/gallon to about 13.2 pounds/gallon, about 12 pounds/gallon to about 13.5 pounds/gallon, about 12 pounds/gallon to about 14 pounds/gallon, about 12 pounds/gallon to about 14.5 pounds/gallon, about 12 pounds/gallon to about 15 pounds/gallon, about 12 pounds/gallon to about 20 pounds/gallon, about 12 pounds/gallon to about 25 pounds/gallon, about 12.5 pounds/gallon to about 13 pounds/gallon, about 12.5 pounds/gallon to about 13.2 pounds/gallon, about 12.5 pounds/gallon to about 13.5 pounds/gallon, about 12.5 pounds/gallon to about 14 pounds/gallon, about 12.5 pounds/gallon to about 14.5 pounds/gallon, about 12.5 pounds/gallon to about 15 pounds/gallon, about 12.5 pounds/gallon to about 20 pounds/gallon, about 12.5 pounds/gallon to about 25 pounds/gallon, about 13 pounds/gallon to about 13.2 pounds/gallon, about 13 pounds/gallon to about 13.5 pounds/gallon, about 13 pounds/gallon to about 14 pounds/gallon, about 13 pounds/gallon to about 14.5 pounds/gallon, about 13 pounds/gallon to about 15 pounds/gallon, about 13 pounds/gallon to about 20 pounds/gallon, about 13 pounds/gallon to about 25 pounds/gallon, about 13.5 pounds/gallon to about 14 pounds/gallon, about 13.5 pounds/gallon to about 14.5 pounds/gallon, about 13.5 pounds/gallon to about 15 pounds/gallon, about 13.5 pounds/gallon to about 20 pounds/gallon, about 13.5 pounds/gallon to about 25 pounds/gallon, about 14 pounds/gallon to about 15 pounds/gallon, about 14 pounds/gallon to about 20 pounds/gallon, about 14 pounds/gallon to about 25 pounds/gallon, about 15 pounds/gallon to about 20 pounds/gallon, about 15 pounds/gallon to about 25 pounds/gallon, or about 20 pounds/gallon to about 25 pounds/gallon. In some cases, the density of the ultra-high-density concentrated brine stream is measured at a temperature of about 120° F. or less, about 100° F. or less, about 80° F. or less, about 72° F. or less, about 68° F. or less, about 60° F. or less, about 50° F. or less, or about 40° F. or less. In some embodiments, the density of the ultra-high-density concentrated brine stream is measured at a temperature of at least about 40° F., at least about 50° F., at least about 60° F., at least about 68° F., at least about 72° F., at least about 80° F., at least about 100° F., or at least about 120° F. In some embodiments, the density of the ultra-high-density concentrated brine stream is measured at a temperature in the range of about 40° F. to about 120° F., about 40° F. to about 100° F., about 40° F. to about 80° F., about 40° F. to about 72° F., about 40° F. to about 68° F., about 40° F. to about 60° F., about 40° F. to about 50° F., about 60° F. to about 120° F., about 60° F. to about 100° F., about 60° F. to about 80° F., about 60° F. to about 72° F., or about 60° F. to about 68° F.

In some cases, the concentration of at least one dissolved salt (e.g., NaCl) in the ultra-high-density concentrated brine stream is relatively high. In certain cases, the concentration of at least one dissolved salt in the ultra-high-density concentrated brine stream is at least about 10,000 mg/L, at least about 20,000 mg/L, at least about 50,000 mg/L, at least about 80,000 mg/L, at least about 85,000 mg/L, at least about 90,000 mg/L, at least about 100,000 mg/L, at least about 150,000 mg/L, at least about 180,000 mg/L, at least about 200,000 mg/L, at least about 250,000 mg/L, at least about 270,000 mg/L, at least about 300,000 mg/L, at least about 350,000 mg/L, at least about 380,000 mg/L, at least about 400,000 mg/L, at least about 450,000 mg/L, at least about 480,000 mg/L, at least about 500,000 mg/L, at least about 600,000 mg/L, at least about 700,000 mg/L, at least about 800,000 mg/L, at least about 900,000 mg/L, at least about 1,000,000 mg/L, or at least about 1,100,000 mg/L (and/or, in certain embodiments, up to the solubility limit of the salt in the concentrated brine stream). In some embodiments, the concentration of at least one dissolved salt in the ultra-high-density concentrated brine stream is in the range of about 10,000 mg/L to about 500,000 mg/L, about 20,000 mg/L to about 500,000 mg/L, about 50,000 mg/L to about 500,000 mg/L, about 80,000 mg/L to about 500,000 mg/L, about 85,000 mg/L to about 500,000 mg/L, about 90,000 mg/L to about 500,000 mg/L, about 100,000 mg/L to about 500,000 mg/L, about 150,000 mg/L to about 500,000 mg/L, about 180,000 mg/L to about 500,000 mg/L, about 200,000 mg/L to about 500,000 mg/L, about 250,000 mg/L to about 500,000 mg/L, about 280,000 mg/L to about 500,000 mg/L, about 300,000 mg/L to about 500,000 mg/L, about 350,000 mg/L to about 500,000 mg/L, about 380,000 mg/L to about 500,000 mg/L, about 400,000 mg/L to about 500,000 mg/L, or about 450,000 mg/L to about 500,000 mg/L, about 10,000 mg/L to about 1,100,000 mg/L, about 20,000 mg/L to about 1,100,000 mg/L, about 50,000 mg/L to about 1,100,000 mg/L, about 80,000 mg/L to about 1,100,000 mg/L, about 85,000 mg/L to about 1,100,000 mg/L, about 90,000 mg/L to about 1,100,000 mg/L, about 100,000 mg/L to about 1,100,000 mg/L, about 150,000 mg/L to about 1,100,000 mg/L, about 180,000 mg/L to about 1,100,000 mg/L, about 200,000 mg/L to about 1,100,000 mg/L, about 250,000 mg/L to about 1,100,000 mg/L, about 280,000 mg/L to about 1,100,000 mg/L, about 300,000 mg/L to about 1,100,000 mg/L, about 350,000 mg/L to about 1,100,000 mg/L, about 380,000 mg/L to about 1,100,000 mg/L, about 400,000 mg/L to about 1,100,000 mg/L, about 450,000 mg/L to about 1,100,000 mg/L, about 500,000 mg/L to about 1,100,000 mg/L, about 600,000 mg/L to about 1,100,000 mg/L, about 700,000 mg/L to about 1,100,000 mg/L, about 800,000 mg/L to about 1,100,000 mg/L, about 900,000 mg/L to about 1,100,000 mg/L or about 1,000,000 mg/L to about 1,100,000 mg/L.

In some embodiments, the ultra-high-density concentrated brine stream contains at least one dissolved salt (e.g., NaCl) in an amount of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, at least about 30 wt %, at least about 35 wt %, at least about 40 wt %, at least about 50 wt %, at least about 60 wt %, or at least about 70 wt % (and/or, in certain embodiments, up to the solubility limit of the salt in the concentrated brine stream). In some embodiments, the ultra-high-density concentrated brine stream comprises at least one dissolved salt in an amount in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 1 wt % to about 35 wt %, about 1 wt % to about 40 wt %, about 1 wt % to about 50 wt %, about 1 wt % to about 60 wt %, about 1 wt % to about 70 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 10 wt % to about 35 wt %, about 10 wt % to about 40 wt %, about 10 wt % to about 50 wt %, about 10 wt % to about 60 wt %, about 10 wt % to about 70 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 20 wt % to about 35 wt %, about 20 wt % to about 40 wt %, about 20 wt % to about 50 wt %, about 20 wt % to about 60 wt %, about 20 wt % to about 70 wt %, about 25 wt % to about 26 wt %, about 25 wt % to about 27 wt %, about 25 wt % to about 28 wt %, about 25 wt % to about 29 wt %, or about 25 wt % to about 30 wt %, about 25 wt % to about 35 wt %, about 25 wt % to about 40 wt %, about 25 wt % to about 50 wt %, about 25 wt % to about 60 wt %, about 25 wt % to about 70 wt %, about 30 wt % to about 40 wt %, about 30 wt % to about 50 wt %, about 30 wt % to about 60 wt %, about 30 wt % to about 70 wt %, about 40 wt % to about 50 wt %, about 40 wt % to about 60 wt %, about 40 wt % to about 70 wt %, about 50 wt % to about 60 wt %, about 50 wt % to about 70 wt %, about 60 wt % to about 70 wt %.

In some embodiments, the total dissolved salt concentration of the ultra-high-density concentrated brine stream may be relatively high. In certain cases, the total dissolved salt concentration of the ultra-high-density concentrated brine stream is at least about 50,000 mg/L, at least about 80,000 mg/L, at least about 85,000 mg/L, at least about 90,000 mg/L, at least about 100,000 mg/L, at least about 150,000 mg/L, at least about 180,000 mg/L, at least about 200,000 mg/L, at least about 250,000 mg/L, at least about 270,000 mg/L, at least about 300,000 mg/L, at least about 350,000 mg/L, at least about 380,000 mg/L, at least about 400,000 mg/L, at least about 450,000 mg/L, at least about 480,000 mg/L, at least about 500,000 mg/L, at least about 600,000 mg/L, at least about 700,000 mg/L, at least about 800,000 mg/L, at least about 900,000 mg/L, at least about 1,000,000 mg/L, or at least about 1,100,000 mg/L, or at least about 1,200,000 mg/L (and/or, in certain embodiments, up to the solubility limit of the salt(s) in the concentrated brine stream). In some embodiments, the total dissolved salt concentration of the ultra-high-density concentrated brine stream is in the range of about 10,000 mg/L to about 500,000 mg/L, about 50,000 mg/L to about 500,000 mg/L, about 80,000 mg/L to about 500,000 mg/L, about 85,000 mg/L to about 500,000 mg/L, about 90,000 mg/L to about 500,000 mg/L, about 100,000 mg/L to about 500,000 mg/L, about 150,000 mg/L to about 500,000 mg/L, about 180,000 mg/L to about 500,000 mg/L, about 200,000 mg/L to about 500,000 mg/L, about 250,000 mg/L to about 500,000 mg/L, about 280,000 mg/L to about 500,000 mg/L, about 300,000 mg/L to about 500,000 mg/L, about 350,000 mg/L to about 500,000 mg/L, about 380,000 mg/L to about 500,000 mg/L, about 400,000 mg/L to about 500,000 mg/L, or about 450,000 mg/L to about 500,000 mg/L, about 10,000 mg/L to about 1,200,000 mg/L, about 20,000 mg/L to about 1,200,000 mg/L, about 50,000 mg/L to about 1,200,000 mg/L, about 80,000 mg/L to about 1,200,000 mg/L, about 85,000 mg/L to about 1,200,000 mg/L, about 90,000 mg/L to about 1,200,000 mg/L, about 100,000 mg/L to about 1,200,000 mg/L, about 150,000 mg/L to about 1,200,000 mg/L, about 180,000 mg/L to about 1,200,000 mg/L, about 200,000 mg/L to about 1,200,000 mg/L, about 250,000 mg/L to about 1,200,000 mg/L, about 280,000 mg/L to about 1,200,000 mg/L, about 300,000 mg/L to about 1,200,000 mg/L, about 350,000 mg/L to about 1,200,000 mg/L, about 380,000 mg/L to about 1,200,000 mg/L, about 400,000 mg/L to about 1,200,000 mg/L, about 450,000 mg/L to about 1,200,000 mg/L, about 500,000 mg/L to about 1,200,000 mg/L, about 600,000 mg/L to about 1,200,000 mg/L, about 700,000 mg/L to about 1,200,000 mg/L, about 800,000 mg/L to about 1,200,000 mg/L, about 900,000 mg/L to about 1,200,000 mg/L or about 1,000,000 mg/L to about 1,200,000 mg/L.

In some embodiments, the ultra-high-density concentrated brine stream contains a total amount of dissolved salts of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, at least about 30 wt %, at least about 35 wt %, at least about 40 wt %, at least about 50 wt %, at least about 60 wt %, or at least about 70 wt %, or at least about 80 wt %. In some embodiments, the ultra-high-density concentrated brine stream comprises a total amount of dissolved salts in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 1 wt % to about 35 wt %, about 1 wt % to about 40 wt %, about 1 wt % to about 50 wt %, about 1 wt % to about 60 wt %, about 1 wt % to about 70 wt %, about 1 wt % to about 80 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 10 wt % to about 35 wt %, about 10 wt % to about 40 wt %, about 10 wt % to about 50 wt %, about 10 wt % to about 60 wt %, about 10 wt % to about 70 wt %, about 10 wt % to about 80 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 20 wt % to about 35 wt %, about 20 wt % to about 40 wt %, about 20 wt % to about 50 wt %, about 20 wt % to about 60 wt %, about 20 wt % to about 70 wt %, about 20 wt % to about 80 wt %, about 25 wt % to about 26 wt %, about 25 wt % to about 27 wt %, about 25 wt % to about 28 wt %, about 25 wt % to about 29 wt %, or about 25 wt % to about 30 wt %, about 25 wt % to about 35 wt %, about 25 wt % to about 40 wt %, about 25 wt % to about 50 wt %, about 25 wt % to about 60 wt %, about 25 wt % to about 70 wt %, about 25 wt % to about 80 wt %, about 30 wt % to about 40 wt %, about 30 wt % to about 50 wt %, about 30 wt % to about 60 wt %, about 30 wt % to about 70 wt %, about 30 wt % to about 80 wt %, about 40 wt % to about 50 wt %, about 40 wt % to about 60 wt %, about 40 wt % to about 70 wt %, about 40 wt % to about 80 wt %, about 50 wt % to about 60 wt %, about 50 wt % to about 70 wt %, about 50 wt % to about 80 wt %, about 60 wt % to about 70 wt %, about 60 wt % to about 80 wt %, or about 70 wt % to about 80 wt %.

According to some embodiments, a hybrid system for producing a concentrated brine stream optionally comprises a pretreatment system and/or precipitation apparatus fluidly connected to one or more desalination units. In certain cases, for example, a liquid feed stream comprising water and at least one dissolved salt may flow through an optional pretreatment system prior to entering a desalination unit. The optional pretreatment system may optionally comprise a separation apparatus, an ion-removal apparatus, a suspended solids removal apparatus, a pH adjustment apparatus, a volatile organic material (VOM) removal apparatus, and/or a filtration apparatus. In some cases, it may be advantageous for a liquid feed stream to flow through a pretreatment system prior to flowing through a desalination unit in order to remove one or more contaminants (e.g., scaling ions, suspended solids, water-immiscible materials, etc.) that may impede operation of the desalination system.

Exemplary systems for producing a pretreated stream, useful according to certain embodiments of the invention, are shown and described in commonly-owned U.S. patent application Ser. No. 14/719,189, filed May 21, 2015, and issued as U.S. Pat. No. 9,266,748 on Feb. 23, 2016; U.S. patent application Ser. No. 14/719,295, filed May 21, 2015, and entitled "Methods and Systems for Producing Treated Brines"; U.S. patent application Ser. No. 14/719,299, filed May 21, 2015, and entitled "Methods and Systems for Producing Treated Brines for Desalination"; U.S. patent application Ser. No. 15/041,977, filed Feb. 11, 2016, and entitled "Production of Ultra-High-Density Brines"; and U.S. patent application Ser. No. 14/494,101, filed Sep. 23, 2014, and entitled "Desalination Systems and Associated Methods."

It may be advantageous, in some cases, for a hybrid system for producing a concentrated brine stream to avoid producing solid material (e.g., solid salt) or to reduce the amount of solid material produced, as it may be expensive and/or complicated to dispose of certain solid materials. According to some embodiments, approximately about 70%, about 80%, about 90%, about 95%, about 99% or about 100% by weight of the material discharged from the hybrid system for producing a concentrated brine stream is substantially a liquid or a gas. In some embodiments, the concentration of solid material is about 5000 mg/L or less, about 2000 mg/L or less, about 1500 mg/L or less, about 1000 mg/L or less, about 750 mg/L or less, about 500 mg/L or less, about 200 mg/L or less, about 100 mg/L or less, about 75 mg/L or less, about 50 mg/L or less, about 20 mg/L or less, or about 10 mg/L or less. In some embodiments, the concentration of solid material is in the range of about 10 mg/L to about 5000 mg/L, about 10 mg/L to about 2000 mg/L, about 10 mg/L to about 1500 mg/L, about 10 mg/L to about 1000 mg/L, about 10 mg/L to about 750 mg/L, about 10 mg/L to about 500 mg/L, about 10 mg/L to about 200 mg/L, about 10 mg/L to about 100 mg/L, about 10 mg/L to about 75 mg/L, about 10 mg/L to about 50 mg/L, about 0 mg/L to about 5000 mg/L, about 0 mg/L to about 2000 mg/L, about 0 mg/L to about 1500 mg/L, about 0 mg/L to about 1000 mg/L, about 0 mg/L to about 750 mg/L, about 0 mg/L to about 500 mg/L, about 0 mg/L to about 200 mg/L, about 0 mg/L to about 100 mg/L, about 0 mg/L to about 75 mg/L, about 0 mg/L to about 50 mg/L, about 0 mg/L to about 20 mg/L, or about 0 mg/L to about 10 mg/L. In some embodiments, a hybrid system for producing a concentrated brine stream may produce substantially no solid material.

In some embodiments, a transiently-operated portion of a hybrid desalination system may produce an amount of solid material. For example, in some cases, a system for producing a concentrated brine stream may produce supersaturated brines. In certain embodiments, supersaturated brines can be used to produce solid salt. In certain cases, it may be advantageous for a system to produce solid salt, as it may be easier to dispose of solid salt than certain liquid and/or gas products.

In some embodiments, the hybrid system for producing a concentrated brine stream comprises a precipitation apparatus. In some cases, the precipitation apparatus is fluidly connected to one or more desalination units (e.g., one or more transiently-operated desalination units) and is configured to receive a concentrated brine stream from the one or more desalination units. The precipitation apparatus is, in certain embodiments, configured to precipitate at least a portion of the dissolved salt from the concentrated brine stream to produce a product stream containing less of the dissolved salt relative to the concentrated brine stream. For example, in FIG. 1A, precipitation apparatus 126 can be configured such that at least a portion of the salt within concentrated brine stream 124 precipitates within precipitation apparatus 126 to produce substantially pure water stream 128, which contains less dissolved salt than concentrated brine stream 124, and solid stream 130 comprising the precipitated salt.

The precipitation apparatus can be manufactured in any suitable manner. In certain embodiments, the precipitation apparatus comprises a vessel, such as a crystallization tank. The vessel may include an inlet through which at least a portion of the concentrated brine stream produced by the desalination system is transported into the precipitation vessel. The precipitation vessel may also include at least one outlet. For example, the precipitation vessel may include an outlet through which the water-containing stream (containing the dissolved salt in an amount that is less than that contained in the inlet stream) is transported. In some embodiments, the precipitation vessel includes an outlet through which solid, precipitated salt is transported.

In some embodiments, the crystallization tank comprises a low shear mixer. The low shear mixer can be configured to keep the crystals that are formed mixed (e.g., homogeneously mixed) in the brine stream. According to certain embodiments, the vessel is sized such that there is sufficient residence time for crystals to form and grow. In certain embodiments, the precipitation apparatus comprises a vessel which provides at least 20 minutes of residence time for the concentrated brine stream. As one non-limiting example, the vessel comprises, according to certain embodiments, a 6000 gallon vessel, which can be used to provide 24 minutes of residence in a 500 US barrel per day fresh water production system.

Those of ordinary skill in the art are capable of determining the residence time of a volume of fluid in a vessel. For a batch (i.e., non-flow) system, the residence time corresponds to the amount of time the fluid spends in the vessel. For a flow-based system, the residence time is determined by dividing the volume of the vessel by the volumetric flow rate of the fluid through the vessel.

In some embodiments the crystallization tank is fluidly connected to a storage tank. The storage tank may have, in some embodiments, a capacity that is substantially the same as the capacity of the crystallization tank. In certain embodiments, the crystallization tank and/or the storage tank can be configured to accommodate batch operation of a downstream solid handling apparatus, which can be fluidly coupled to the precipitation apparatus.

In some embodiments, the precipitation apparatus comprises at least one vessel comprising a volume within which the concentrated brine stream is substantially quiescent. In some embodiments, the flow rate of the fluid within the substantially quiescent volume is less than the flow rate at which precipitation (e.g., crystallization) is inhibited. For example, the flow rate of the fluid within the substantially quiescent volume may have, in certain embodiments, a flow rate of zero. In some embodiments, the flow rate of the fluid within the substantially quiescent volume may have a flow rate that is sufficiently high to suspend the formed solids (e.g., crystals), but not sufficiently high to prevent solid formation (e.g., crystal nucleation). The substantially quiescent volume within the vessel may occupy, in some embodiments, at least about 1%, at least about 5%, at least about 10%, or at least about 25% of the volume of the vessel. As one particular example, the precipitation apparatus can comprise a vessel including a stagnation zone. The stagnation zone may be positioned, for example, at the bottom of the precipitation vessel. In certain embodiments, the precipitation apparatus can include a second vessel in which the solids precipitated in the first vessel are allowed to settle. For example, an aqueous stream containing the precipitated solids can be transported to a crystallization tank, where the solids can be allowed to settle. The remaining contents of the aqueous stream can be transported out of the crystallization tank. While the use of two vessels within the precipitation apparatus has been described, it should be understood that, in other embodiments, a single vessel, or more than two vessels may be employed. In certain embodiments, the desalination system can be operated such that precipitation of the salt occurs substantially only within the stagnation zone of the precipitation vessel.

In some embodiments, the precipitated salt from the precipitation apparatus is fed to a solids-handling apparatus. The solids-handling apparatus may be configured, in certain embodiments, to remove at least a portion of the water retained by the precipitated salt. In some such embodiments, the solids-handling apparatus is configured to produce a cake comprising at least a portion of the precipitated salt from the precipitation apparatus. As one example, the solids-handling apparatus can comprise a filter (e.g., a vacuum drum filter or a filter press) configured to at least partially separate the precipitated salt from the remainder of a suspension containing the precipitated salt. In some such embodiments, at least a portion of the liquid within the salt suspension can be transported through the filter, leaving behind solid precipitated salt. As one non-limiting example, a Larox FP 2016-8000 64/64 M40 PP/PP Filter (Outotec, Inc.) may be used as the filter. The filter may comprise, in certain embodiments, a conveyor filter belt which filters the salt from a suspension containing the salt.

In some embodiments, the hybrid desalination system comprises a transport device configured to transport precipitated salt away from the precipitation apparatus. For example, in certain embodiments, a pump is used to transport a suspension of the precipitated salt away from the precipitation apparatus. In other embodiments, a conveyor could be used to transport precipitated salt away from the precipitation apparatus. In certain embodiments, the transport device is configured to transport the precipitated salt from the precipitation apparatus to a solids-handling apparatus.

U.S. Provisional Application No. 62/298,332, filed Feb. 22, 2016, and entitled "Hybrid Desalination Systems and Associated Methods" is incorporated herein by reference in its entirety for all purposes.

The following example is intended to illustrate certain embodiments of the present invention, but does not exemplify the full scope of the invention.

Example 1

In this example, a hybrid system for producing a concentrated brine stream comprising a plurality of HDH desalination units fluidically interconnected in series and a fluidic circuit comprising a HDH desalination unit is described. The configuration of the system is as shown in FIG. 1B.

As illustrated in FIG. 1B, hybrid system 100 comprised first desalination units 102A, 102B, and 102C and a fluidic circuit comprising second desalination unit 104 and collection vessel 106. In this example, each of desalination units 102A, 102B, 102C, and 104 was an HDH desalination unit.

In operation, first desalination units 102A, 102B, and 102C were operated under steady-state conditions. Second desalination unit 104 was transiently operated.

Initially, a first liquid stream having a salinity of 12% entered first desalination unit 102A through conduit 108 at a flow rate of 125 gpm. In first desalination unit 102A, a first substantially pure water stream having a salinity of about 0% and a first concentrated brine stream having a salinity of 13.9% were produced. The first substantially pure water stream was discharged from first desalination unit 102A through conduit 110 at a flow rate of 74 gpm. A first portion of the first concentrated brine stream was reintroduced into first desalination unit 102A through conduit 114 at a flow rate of 485 gpm, such that the average salinity of the liquid stream entering desalination unit 102A (e.g., the stream combining the first liquid stream and the first portion of the first concentrated brine stream) was 13.4%. A second portion of the first concentrated brine stream was directed to flow through conduit 116 to first desalination unit 102B at a flow rate of 109 gpm.

In first desalination unit 102B, a second substantially pure water stream having a salinity of about 0% and a second concentrated brine stream having a salinity of 16.4% were produced. The second substantially pure water stream was discharged from first desalination unit 102B through conduit 132 at a flow rate of 74 gpm. A first portion of the second concentrated brine stream was reintroduced into first desalination unit 102B through conduit 136 at a flow rate of 493 gpm, such that the average salinity of the liquid stream entering first desalination unit 102B (e.g., the stream combining the second portion of the first concentrated brine stream and the first portion of the second concentrated brine stream) was 15.8%. A second portion of the second concentrated brine stream was directed to flow through conduit 138 to first desalination unit 102C at a flow rate of 90 gpm.

In first desalination unit 102C, a third substantially pure water stream having a salinity of about 0% and a third concentrated brine stream having a salinity of 20.1% were produced. The third substantially pure water stream was discharged from first desalination unit 102C through conduit 140 at a flow rate of 74 gpm. A first portion of the third concentrated brine stream was reintroduced into first desalination unit 102C through conduit 144 at a flow rate of 503 gpm, such that the average salinity of the liquid stream entering first desalination unit 102C (e.g., the stream combining the second portion of the second concentrated brine stream and the first portion of the third concentrated brine stream) was 19.4%. A second portion of the third concentrated brine stream was directed to flow through conduit 146 to collection vessel 106 at a flow rate of 72 gpm.

Collection vessel 106 formed a fluidic circuit with second desalination unit 104 and conduits 118 and 120. The third concentrated brine stream flowed from collection vessel 106 to second desalination unit 104 through conduit 118. In second desalination unit 104, a fourth substantially pure water stream having a salinity of about 0% and a fourth concentrated brine stream were produced. The fourth substantially pure water stream was discharged from second desalination unit 104 through conduit 122. The fourth concentrated brine stream was recirculated through the fluidic circuit (e.g., directed to flow through conduit 120, collection vessel 106, and conduit 118 back to second desalination unit 104) at a flow rate of 1321 gpm, and the salinity of the recirculated fourth concentrated brine stream successively increased from 20.1% to 25.2%. When the recirculated fourth concentrated brine stream reached a salinity of 26%, the recirculated fourth concentrated brine stream was discharged from hybrid system 100 through conduit 124 at an average flow rate of 54 gpm.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for producing a concentrated brine stream, comprising:
   removing at least a portion of water from a first liquid stream comprising the water and at least one dissolved salt at an initial concentration to produce a first concentrated brine stream comprising water and the at least one dissolved salt at a second concentration higher than the initial concentration of the first liquid stream;
   supplying at least a portion of the first concentrated brine stream to a fluidic circuit comprising a vessel and at least one conduit fluidically connected to the vessel, wherein the fluidic circuit establishes a fluidic pathway out of the vessel, through the at least one conduit, and back into the vessel;
   removing, within the fluidic circuit, at least a portion of the water from the first concentrated brine stream to produce a second concentrated brine stream comprising water and the at least one dissolved salt at a third concentration higher than the second concentration of the first concentrated brine stream;
   recirculating the second concentrated brine stream through at least a portion of the fluidic circuit to remove at least a portion of the water from the second concentrated brine stream, forming a recirculated second concentrated brine stream comprising water and the at least one dissolved salt at a fourth concentration higher than the third concentration of the second concentrated brine stream, wherein recirculating the second concentrated brine stream comprises flowing the second concentrated brine stream out of the vessel, through the at least one conduit, and back into the vessel; and
   discharging the recirculated second concentrated brine stream from the fluidic circuit when the recirculated second concentrated brine stream reaches a density of at least about 10 pounds per gallon.

2. The method according to claim 1, wherein the recirculated second concentrated brine stream has a salinity of at least about 25% by weight upon discharge from the fluidic circuit.

3. The method according to claim 1, wherein the method is performed under steady-state conditions.

4. The method according to claim 1, wherein the method is performed continuously.

5. The method according to claim 1, wherein removing at least a portion of water from the first liquid stream is performed in one or more first desalination units, and a portion of the first concentrated brine stream is recirculated through at least one of the one or more first desalination units.

6. The method according to claim 1, wherein removing at least a portion of water from the first liquid stream comprises transporting the liquid stream through a single-pass fluidic pathway.

7. The method according to claim 1, wherein removing at least a portion of water from the first liquid stream is performed in two or more first desalination units.

8. The method according to claim 7, wherein the two or more first desalination units are fluidically interconnected in series.

9. The method according to claim 1, wherein the method is performed transiently.

10. The method according to claim 1, wherein at least a portion of the first concentrated brine stream is continuously supplied to the fluidic circuit.

11. The method according to claim 1, wherein removing at least a portion of the water from the first concentrated brine stream is performed in two or more second desalination units.

12. The method according to claim 11, wherein the two or more second desalination units are fluidically interconnected in parallel.

13. The method according to claim 1, wherein recirculating the second concentrated brine stream comprises recirculating at least a first portion of the second concentrated brine stream until the first portion reaches a density of at least about 10 pounds per gallon and/or a salinity of at least about 25% by weight.

14. The method according to claim 1, wherein removing at least a portion of water from the first liquid stream comprises flowing the first liquid stream through a humidification-dehumidification (HDH) desalination unit.

15. The method according to claim 1, wherein removing at least a portion of the water from the first concentrated brine stream comprises flowing the first liquid stream through an HDH desalination unit.

16. The method according to claim 15, wherein the HDH desalination unit comprises a bubble column humidifier.

17. A method for producing a concentrated brine stream, comprising:
   removing at least a portion of water from a first liquid stream comprising the water and at least one dissolved salt at an initial concentration to produce a first concentrated brine stream comprising water and the at least one dissolved salt at a second concentration higher than the initial concentration of the first liquid stream;
   supplying at least a portion of the first concentrated brine stream to a fluidic circuit comprising a vessel and at least one conduit fluidically connected to the vessel, wherein the fluidic circuit establishes a fluidic pathway out of the vessel, through the at least one conduit, and back into the vessel;

removing, within the fluidic circuit, at least a portion of the water from the first concentrated brine stream to produce a second concentrated brine stream comprising water and the at least one dissolved salt at a third concentration higher than the second concentration of the first concentrated brine stream;

recirculating the second concentrated brine stream through at least a portion of the fluidic circuit to remove at least a portion of the water from the second concentrated brine stream, forming a recirculated second concentrated brine stream comprising water and the at least one dissolved salt at a fourth concentration higher than the third concentration of the second concentrated brine stream, wherein recirculating the second concentrated brine stream comprises flowing the second concentrated brine stream out of the vessel, through the at least one conduit, and back into the vessel; and discharging the recirculated second concentrated brine stream from the fluidic circuit when the salinity reaches at least about 25% by weight.

18. The method according to claim 17, wherein the recirculated second concentrated brine stream has a density of at least about 10 pounds per gallon upon discharge from the fluidic circuit.

\* \* \* \* \*